(12) United States Patent
Onda et al.

(10) Patent No.: US 6,996,203 B2
(45) Date of Patent: Feb. 7, 2006

(54) BIDIRECTIONAL SHIFT REGISTER AND DISPLAY DEVICE INCORPORATING SAME

(75) Inventors: Mamoru Onda, Tenri (JP); Hajime Washio, Sakurai (JP); Shunsuke Hayashi, Onomichi (JP); Hiroshi Murofushi, Kyoto (JP); Nobuhiko Suzuki, Takatsuki (JP)

(73) Assignee: Sharp Kabushiki Kaisha, Osaka (JP)

( * ) Notice: Subject to any disclaimer, the term of this patent is extended or adjusted under 35 U.S.C. 154(b) by 21 days.

(21) Appl. No.: 10/860,660

(22) Filed: Jun. 4, 2004

(65) Prior Publication Data

US 2005/0017065 A1    Jan. 27, 2005

(30) Foreign Application Priority Data

Jun. 10, 2003  (JP)  ............................. 2003-165531
Sep. 8, 2003   (JP)  ............................. 2003-315813

(51) Int. Cl.
    *G11C 19/00*    (2006.01)
(52) U.S. Cl. .......................................... 377/75; 377/69
(58) Field of Classification Search .................... None
    See application file for complete search history.

(56) References Cited

U.S. PATENT DOCUMENTS 3,051,848 A *  8/1962  Edward ........................ 377/69
3,584,308 A *  6/1971  Neu ............................. 377/69
5,170,368 A * 12/1992  Hattori ....................... 708/313
5,719,913 A *  2/1998  Maeno ........................ 377/54
6,418,182 B1*  7/2002  Suyama et al. ............... 377/69
6,427,158 B1*  7/2002  Wang et al. ................. 708/313
6,724,363 B1   4/2004  Satoh et al. ................. 345/100
2004/0239659 A1* 12/2004  Toriumi et al. .............. 345/204

FOREIGN PATENT DOCUMENTS

JP    8-62580 A    3/1996

OTHER PUBLICATIONS

USSN 10/788, 161 patent application filed Feb. 25, 2004 entiitled Two-Way Shift Register and Image Display Device Using the Same.

* cited by examiner

*Primary Examiner*—Timothy P. Callahan
*Assistant Examiner*—Cassandra Cox
(74) *Attorney, Agent, or Firm*—Nixon & Vanderhye, P.C.

(57) ABSTRACT

The present invention includes: a shift register section, including multiple-stage flip-flops operating in synchronism with a clock signal, for switching a shift direction in accordance with an externally supplied direction instruct signal; a waveform change section for changing in waveform a signal output of one of the flip-flops which is in a first predetermined stage; and an inspection signal switching section for switching, in accordance with the direction instruct signal, an output between the signal output which has been changed in waveform in the waveform change section and a signal output of one of the flip-flops which is in a second predetermined stage.

19 Claims, 39 Drawing Sheets

LR (INSTRUCTION)
LR (ERROR) = Low

LR (INSTRUCTION)
LR (ERROR) = Low

LR (INSTRUCTION)
LR (ERROR) = Low

CTL=High then OUT=IN
CTL=Low then OUT=Hi-Z

CTL=Low then OUT=IN
CTL=High then OUT=Hi-Z

BIDIRECTIONAL SHIFT REGISTER AND DISPLAY DEVICE INCORPORATING SAME

This Nonprovisional application claims priority under 35 U.S.C. § 119(a) on Patent Applications No. 2003-165531 filed in Japan on Jun. 10, 2003 and No. 2003-315813 filed in Japan on Sep. 8, 2003, the entire contents of which are hereby incorporated by reference.

FIELD OF THE INVENTION

The present invention relates to bidirectional shift registers capable of switching the shift direction between two directions, as well as display devices incorporating such bidirectional shift registers.

BACKGROUND OF THE INVENTION

Bidirectional shift registers capable of producing bidirectional shift pulse outputs are conventionally known. Also known are those which are arranged to produce inspection signal outputs to inspect the operation of a bidirectional shift register.

FIG. 16 is a block diagram showing a display device incorporating a bidirectional shift register arranged to produce inspection signal outputs. A display device 51, as shown in FIG. 16, includes a data signal line drive circuit 52, a scan signal line drive circuit 53, and a display device section 54.

The data signal line drive circuit 52 includes a bidirectional shift register 61, a buffer section 62, and a sampling section 63. The bidirectional shift register 61 includes a shift register section 64 and an inspection signal switching section 65.

The shift register section 64 is a shift register capable of switching its shift direction in accordance with a horizontal instruction signal LR. The shift register section 64 outputs pulse signals $SR_1$, $SR_2$, ... $SR_n$ to the buffer section 62 on the basis of a horizontal shift start signal SSP and a timing-providing horizontal clock signal SCK which has a predetermined cycle.

The horizontal clock signal SCK and the horizontal shift start signal SSP are both rectangular. The pulse signals $SR_1$, $SR_2$, ... $SR_n$ are therefore also rectangular.

The buffer section 62 amplifies the current levels of the pulse signals $SR_1$, $SR_2$, ... $SR_n$. The amplified outputs of the buffer section 62 are fed to the sampling section 63 where video signals VIDEO_R, VIDEO_G, and VIDEO_B separately fed to the sampling section 63 are sampled in accordance with the outputs of the buffer section 62 and supplied to data signal lines in the display device section 54.

The inspection signal switching section 65 switches a shift end signal ADOUT between the last stage outputs ($SR_1$, $SR_n$) of the shift register section 64 in accordance with the horizontal instruction signal LR for output to external circuitry. The inspection signal switching section 65 will be detailed later.

The scan signal line drive circuit 53 includes a bidirectional shift register 71 and a buffer section 72. The bidirectional shift register 71 includes a shift register section 74 and an inspection signal switching section 75.

The shift register section 74 is a shift register capable of switching its shift direction in accordance with a vertical instruction signal UD. The shift register section 74 outputs pulse signals $GL_1$, $GL_2$, ... $GL_m$ to the buffer section 72 on the basis of a vertical direction shift start signal GSP and a timing-providing vertical direction clock signal GCK which has a predetermined cycle.

The vertical direction clock signal GCK and the vertical direction shift start signal GSP are both rectangular. The pulse signals $SR_1$, $SR_2$, ... $SR_n$ are therefore also rectangular.

The buffer section 72 amplifies the current levels of the pulse signals $GL_1$, $GL_2$, ... $GL_m$. The amplified outputs of the buffer section 72 are fed to scan signal lines in the display device section 54.

The inspection signal switching section 75 switches a shift end signal GDOUT between the last stage outputs ($GL_1$, $GL_m$) of the shift register section 74 in accordance with the horizontal instruction signal LR for output to external circuitry.

As in the foregoing, the bidirectional shift register 61 has the same arrangement as the bidirectional shift register 71, except for the number of output signals. The following description will therefore focus on the data signal line drive circuit 52 including the bidirectional shift register 61.

FIG. 17 is a circuit diagram showing an arrangement of the shift register section 64 in the bidirectional shift register 61. As illustrated in the figure, the shift register section 64 includes a set of flip-flops $FF_1$, $FF_2$, ... $FF_n$, a group, $AS_1$, of n analog switches 81, and another group, $AS_2$, of n analog switches 82.

The analog switches 81, 82 change the destinations for the signal outputs of the flip-flop $FF_1$, $FF_2$, ... $FF_n$ in accordance with the horizontal instruction signal LR.

FIG. 18 is a circuit diagram showing an arrangement of the analog switch 81.

As shown in the figure, each analog switch 81 is composed of a CMOS analog switch 81a and an inverter 81b. In the analog switch 81, when the incoming horizontal instruction signal LR is HIGH on the control line CTL, the signal applied to the IN appears unchanged at the OUT. In contrast, when the horizontal instruction signal LR is LOW on the control line CTL, the impedance so increases (Hi-Z state) that whatever signal is applied to the IN, no output appears at the OUT, i.e., the OUT floats.

FIG. 19 is a circuit diagram showing an arrangement of the analog switch 82.

As shown in the figure, each analog switch 82 is also composed of a CMOS analog switch 81a and an inverter 81b. The analog switch 82 however differs from the analog switch 81 in the layout of the inverter 81b.

In the analog switch 82, when the incoming horizontal instruction signal LR is LOW on the control line CTL, the signal applied to the IN appears unchanged at the OUT as an output. In contrast, when the horizontal instruction signal LR is HIGH on the control line CTL, the impedance so increases (Hi-Z state) that whatever signal is applied to the IN, no output appears at the OUT, i.e., the OUT floats.

FIG. 20 is a diagram showing signal flows in the shift register section 64 when the horizontal instruction signal LR is HIGH.

Since the horizontal instruction signal LR is HIGH, as mentioned earlier, only the analog switches 81 constituting the group $AS_1$ allow the input signal at the IN to appear at the OUT as an output. A pulse signal therefore flows as indicated by thick lines in the figure. In other words, the horizontal shift start signal SSP travels from the flip-flop $FF_1$ to the flip-flop $FF_n$ in this order.

FIG. 21 is a diagram showing signal flows in the shift register section 64 when the horizontal instruction signal LR is LOW.

Since the horizontal instruction signal LR is LOW, as mentioned earlier, only the analog switches 82 constituting the group $AS_2$ allow the input signal at the IN to appear at the OUT as an output. A pulse signal therefore flows as indicated by thick lines in the figure. In other words, the horizontal shift start signal SSP travels from the flip-flop $FF_n$ to the flip-flop $FF_1$ in this order.

As in the foregoing, in the bidirectional shift register 61, the last output stage of the shift register section 64 is the one which outputs the pulse signal $SR_n$ when the horizontal instruction signal LR is HIGH and the one which outputs the pulse signal $SR_1$ when the horizontal instruction signal LR is LOW.

FIG. 22 is a circuit diagram showing an arrangement of the buffer section 62 and the sampling section 63 in the data signal line drive circuit 52. As shown in the figure, the buffer section 62 is composed of a set of inverters. The sampling section 63 is composed of CMOS analog switches. Further detailed description of the buffer section 62 and the sampling section 63 is omitted here.

FIG. 23 is a circuit diagram showing an arrangement of the inspection signal switching section 65.

The inspection signal switching section 65 is composed of two CMOS analog switches 81a and an inverter 81b. In the analog switch 81, when the incoming horizontal instruction signal LR is HIGH on the control line CTL, the signal applied to the $IN_1$ appears unchanged at the OUT. In contrast, when the horizontal instruction signal LR is LOW on the control line CTL, the signal applied to the $IN_2$ appears unchanged at the OUT.

Incidentally, the operation of a bidirectional shift register which predates the bidirectional shift register 61 is verified by means of signal outputs at inspection terminals provided to the first and last output stages for signal inspection purposes. The first and last output stages in the shift register act similarly to the stage outputting the pulse signal $SR_1$ and the stage outputting the pulse signal $SR_n$ in the bidirectional shift register 61.

If a bidirectional shift register with inspection terminals on the first and last output stages is used in a display device, in view of display device protection, the inspection terminals on the first and last output stages need to be, for example, treated so as to float with respect to the flexible wiring board, i.e., the terminals do not connect to anything, as shown in FIG. 24(a).

This arrangement requires more inspection terminals than the arrangement in FIG. 24(b) where only one inspection terminal is needed to verify the operation of a bidirectional shift register. Thus, the flexible wiring board needs to accommodate more terminals. These factors can amount to an increase, albeit small, in the price of the flexible wiring board.

In FIGS. 24(a), 24(b), black portions correspond to the wiring on the flexible wiring board or the inspection terminal(s) for the display device.

In addition, in in-line verification of the operation of a bidirectional shift register, signal detection probes need to be used to test inspection terminals as shown in FIG. 25. The inspection terminals, including those on the first and last output stages, need to be located, for example, at 500 μm intervals.

If the inspection terminals are reduced in size, it takes a significantly long time to position the signal detection probes, which makes the approach less competitive in terms of cost.

For these reasons, in the bidirectional shift register 61, the inspection signal switching section 65 having the aforementioned arrangement is provided, the output of the stage outputting the pulse signal $SR_n$ is coupled to the $IN_1$ as an input, and the output of the stage outputting the pulse signal $SR_1$ is coupled to the $IN_2$ as an input.

Thus, when the horizontal instruction signal LR is HIGH, the output of the stage outputting the pulse signal $SR_n$ can be fed as a shift end signal ADOUT to external circuitry; when the horizontal instruction signal LR is LOW, the output of the stage outputting the pulse signal $SR_1$ can be fed as a shift end signal ADOUT to external circuitry.

In this manner, no matter whether the horizontal instruction signal LR is High or Low, the bidirectional shift register 61 outputs a shift end signal ADOUT which is the output of the last stage. Hence, in verifying that the pulse signal reaches the last output stage, the bidirectional shift register 61 only requires the inspection terminals where the shift end signal ADOUT is inspected.

FIG. 26 is a timing chart showing an operation of the bidirectional shift register 61, particularly when the horizontal instruction signal LR changes from HIGH to LOW during an operation.

As shown in the figure as well as FIG. 16, when the horizontal instruction signal LR is HIGH, the pulse signal $SR_n$ is simultaneously fed to both the buffer section 62 and external circuitry as a shift end signal ADOUT via the inspection signal switching section 65.

When the horizontal instruction signal LR is LOW, the pulse signal $SR_1$ is simultaneously fed to both the buffer section 62 and external circuitry as a shift end signal ADOUT via the inspection signal switching section 65.

No matter which state the horizontal instruction signal LR is representing, the bidirectional shift register 61 causes an invariant time delay between the input of the horizontal shift start signal SSP and the output of the shift end signal ADOUT.

U.S. Pat. No. 6,724,363 dated Apr. 20, 2004, an equivalent to Japanese unexamined patent application 2000-322020 (Tokukai 2000-322020; published on Nov. 24, 2000), discloses a power-saving bidirectional shift register which operates normally with input signals of small amplitudes.

Japanese unexamined patent application 8-62580 (Tokukaihei 8-62580/1996; published on Mar. 8, 1996) discloses a display device element with such internal circuitry that the number of inspection terminals can be reduced.

However, although the bidirectional shift register 61 has received an instruction to change the state of the horizontal instruction signal LR, if the horizontal instruction signal LR is fixed in LOW state due to, for example, a defect of internal circuitry of the bidirectional shift register 61, following problems result among others.

Under these conditions, the shift end signal ADOUT output of the bidirectional shift register 61 has the same waveform as the shift end signal ADOUT output of a normal bidirectional shift register 61 (compare FIG. 27 with FIG. 26).

If the horizontal instruction signal LR is fixed in HIGH state due to for example, a defect of internal circuitry of the bidirectional shift register 61, the shift end signal ADOUT output of the bidirectional shift register 61 again has the same waveform as the shift end signal ADOUT output of a normal bidirectional shift register 61 (compare FIG. 28 with FIG. 26).

As in the foregoing, in the bidirectional shift register 61, the pulse signal can be determined to have reached the last stage in both directions in a normal manner even if the bidirectional shift register 61 is not normally responding to the horizontal instruction signal LR.

To manufacture a liquid crystal display device incorporating the bidirectional shift register 61, for example, the bidirectional shift register 61 is fabricated on a board, which is followed by a "liquid crystal step" where the display device element is fabricated on the same board. Thereafter, the display device 51 is turned on for an inspect in which produced displays are checked.

Therefore, when the bidirectional shift register 61 is not normally operating as in the above example, the defect of the bidirectional shift register 61 cannot be found until the register 61 is turned on for inspection.

The liquid crystal step is wasted, making it difficult to lower the manufacturing cost of the display device 51.

Neither Tokukai 2000-322020 nor Tokukaihei 8-62580/1996 disclose technology addressing these problems.

SUMMARY OF THE INVENTION

In view of the problems, the present invention has an objective to provide a bidirectional shift register which can be determined to be operating normally or otherwise in both directions without added inspection terminals and also to provide a display device incorporating such a bidirectional shift register.

A bidirectional shift register in accordance with the present invention, to solve the problems, is characterized in that it includes:

a shift register section, including multiple-stage flip-flops operating in synchronism with a clock signal, for switching a shift direction in accordance with an externally supplied direction instruct signal;

a first waveform change section for changing in waveform a signal output of one of the flip-flops which is in a first predetermined stage; and an inspection signal switching section for switching, in accordance with the direction instruct signal, an output thereof between the signal output which has been changed in waveform in the first waveform change section and a signal output of one of the flip-flops which is in a second predetermined stage.

According to the arrangement, in accordance with a direction instruct signal input for switching a shift direction, the inspection signal switching section switches an output thereof between the signal output which has been changed in waveform in the first waveform change section and a signal output of one of the flip-flops which is in a second predetermined stage. The inspection signal switching section thus outputs different signals in accordance with the direction instruct signal.

If the externally supplied direction instruct signal has been switched without being recognized by the bidirectional shift register, the shift direction is not switched.

If the shift direction is not switched as above, the inspection signal switching section always outputs only any one of the signal output which has been changed in waveform in the waveform change section and a signal output of the flip-flop in the second predetermined stage.

Therefore, by examining a signal output of the inspection signal switching section, it is confirmed whether the bidirectional shift register is switching the bidirectional shift direction, which is an effect of the invention.

Particularly, in cases where a display device is manufactured by first fabricating a bidirectional shift register on a board and then a display device element on the same board, operation can be checked when the fabrication of the bidirectional shift register is completed. Therefore, a defect of the bidirectional shift register can be determined without fabricating the display device element on the same board and checking display state. Situations where a display device element is fabricated for a board carrying a defective bidirectional shift register can be avoided. The manufacturing cost of the display device is reduced.

In addition, the inspection signal switching section has only one output, which requires only one inspection terminal to examine the output. Thus, the inspection terminal occupies a smaller area in the bidirectional shift register, and the manufacturing cost is reduced.

A bidirectional shift register in accordance with the present invention, to solve the problems, is characterized in that it includes:

a shift register section, including multiple-stage flip-flops operating in synchronism with a clock signal, for switching a shift direction in accordance with an externally supplied direction instruct signal;

a first waveform change section for changing in waveform a signal output of one of the flip-flops which is in a first predetermined stage;

a second waveform change section for changing in waveform a signal output of one of the flip-flops which is in a second predetermined stage so that the signal output which has been changed in waveform in the second waveform change section has a different waveform from the signal output which has been changed in waveform in the first waveform change section; and an inspection signal switching section for switching, in accordance with the direction instruct signal, an output thereof between the signal output which has been changed in waveform in the first waveform change section and the signal output which has been changed in waveform in the second waveform change section.

According to the arrangement, in accordance with a direction instruct signal input for switching a shift direction, the inspection signal switching section switches an output thereof between the signal output which has been changed in waveform in the first waveform change section and the signal output which has been changed in waveform in the second waveform change section. The inspection signal switching section thus outputs different signals in accordance with the direction instruct signal.

If the externally supplied direction instruct signal has been switched without being recognized by the bidirectional shift register, the shift direction is not switched.

If the shift direction is not switched as above, the inspection signal switching section always outputs only any one of the signal output which has been changed in waveform in the first waveform change section and a signal output which has been changed in waveform in the second waveform change section.

Therefore, by examining the signal output of the inspection signal switching section, it is confirmed whether the bidirectional shift register is switching the bidirectional shift direction, which is an effect of the invention.

Particularly, in cases where a display device is manufactured by first fabricating a bidirectional shift register on a board and then a display device element on the same board, operation can be checked when the fabrication of the bidirectional shift register is completed. Therefore, a defect of the bidirectional shift register can be determined without fabricating the display device element on the same board and checking display state. Situations where a display device element is fabricated for a board carrying a defective bidirectional shift register can be avoided. The manufacturing cost of the display device is reduced.

In addition, the inspection signal switching section has only one output, which requires only one inspection terminal to examine the output. Thus, the inspection terminal occupies a smaller area in the bidirectional shift register, and the manufacturing cost is reduced.

A display device in accordance with the present invention, to solve the problems, is characterized in that it includes:

pixels arranged in matrix;

data signal lines, each for a different row of the pixels;

scan signal lines, each for a different column of the pixels;

a scan signal line drive circuit for sequentially supplying a scan signal to the scan signal lines at different timings; and a data signal line drive circuit for supplying to the data signal lines a data signal derived for each of the pixels on the scan signal lines to which the scan signal is supplied from a video signal representing display states of the pixels, wherein at least either the scan signal line drive circuit or the data signal line drive circuit includes the aforementioned bidirectional shift register.

According to the arrangement, at least either the scan signal line drive circuit or the data signal line drive circuit includes the aforementioned bidirectional shift register.

Therefore, in cases where a display device is manufactured by first fabricating a bidirectional shift register on a board and then a display device element on the same board, operation can be checked when the fabrication of the bidirectional shift register is completed. Therefore, a defect of the bidirectional shift register can be determined without fabricating the display device element on the same board and checking display state.

Thus, situations where a display device element is fabricated for a board carrying a defective bidirectional shift register can be avoided. The manufacturing cost of the display device is reduced. Hence, inexpensive display devices are provided, which is an effect of the invention.

For a fuller understanding of the nature and advantages of the invention, reference should be made to the ensuing detailed description taken in conjunction with the accompanying drawings.

DESCRIPTION OF THE EMBODIMENTS

The following will describe embodiments of the present invention in reference to FIG. 1 through FIG. 15 and FIG. 29 through FIG. 40.

Figure 1:
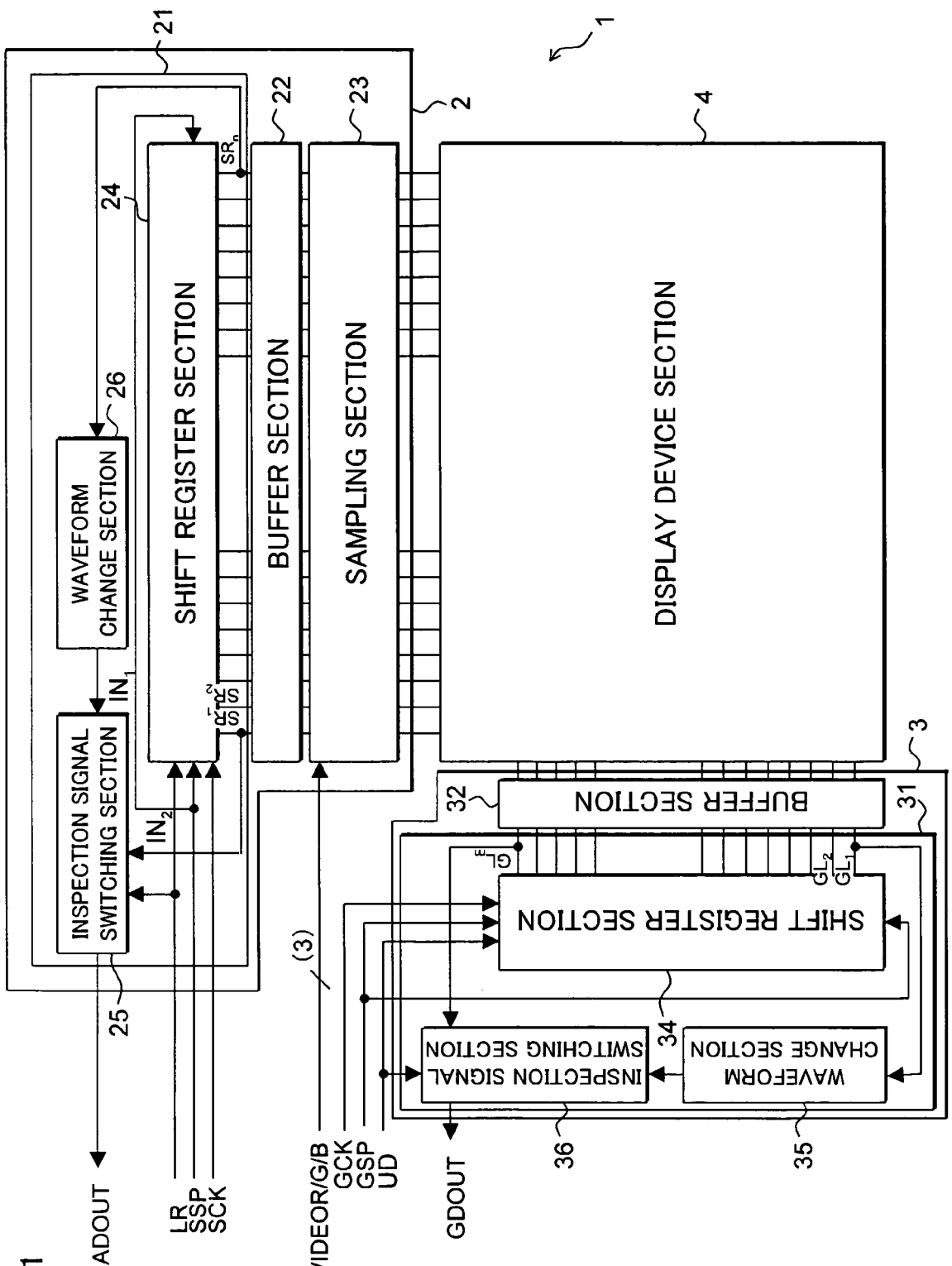
FIG. 1 is a block diagram showing a display device incorporating bidirectional shift registers in accordance with the present embodiment.

FIG. 1 is a block diagram showing a display device incorporating bidirectional shift registers in accordance with the present embodiment.

A display device 1 includes a data signal line drive circuit 2, a scan signal line drive circuit 3, and a display device section 4. The display device section 4 is identical to, the display device section 54 described in the BACKGROUND OF THE INVENTION section, and its description is therefore omitted here.

The data signal line drive circuit 2 includes a bidirectional shift register 21, a buffer section 22, and a sampling section 23. The buffer section 22 and the sampling section 23 are identical respectively to the buffer section 62 and the sampling section 63 described in the BACKGROUND OF THE INVENTION section, and their description is therefore omitted here.

The bidirectional shift register 21 includes a shift register section (shift register means) 24, an inspection signal switching section (first switching means) 25, and a waveform change section (first waveform change means) 26.

In the bidirectional shift register 21, a pulse signal $SR_n$ from the last output stage (or the first output stage) in the shift register section 24 is input to the inspection signal switching section 25 via the waveform change section 26. That is, when a horizontal instruction signal LR is HIGH, the pulse signal $SR_n$ from the last output stage is input to the waveform change section 26; when the horizontal instruction signal LR is LOW, the pulse signal $SR_n$ from the first output stage is input to the waveform change section 26.

The bidirectional shift register 21 is identical to the bidirectional shift register 61 described in the BACKGROUND OF THE INVENTION section, except that the pulse signal $SR_n$ from the last output stage (or the first output stage) is input to the inspection signal switching section 25 via the waveform change section 26. In other words, the shift register section 24 is identical to the shift register section 64 described in the BACKGROUND OF THE INVENTION section, whereas the inspection signal switching section 25 is identical to the inspection signal switching section 65 described in the BACKGROUND OF THE INVENTION section.

Figure 23:
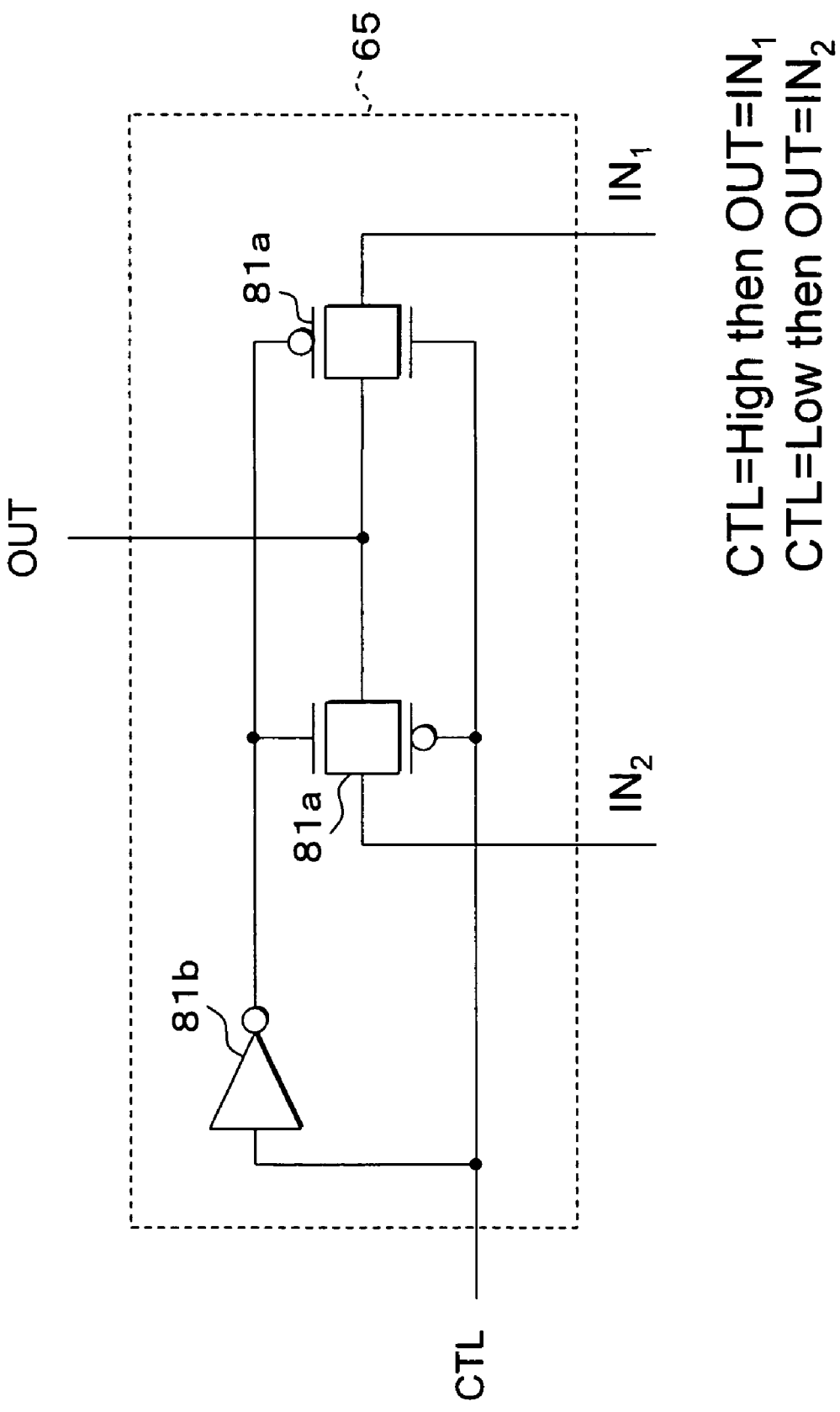
FIG. 23 is a circuit diagram showing an arrangement of an inspection signal switching section in a conventional bidirectional shift register.
Figure 24:
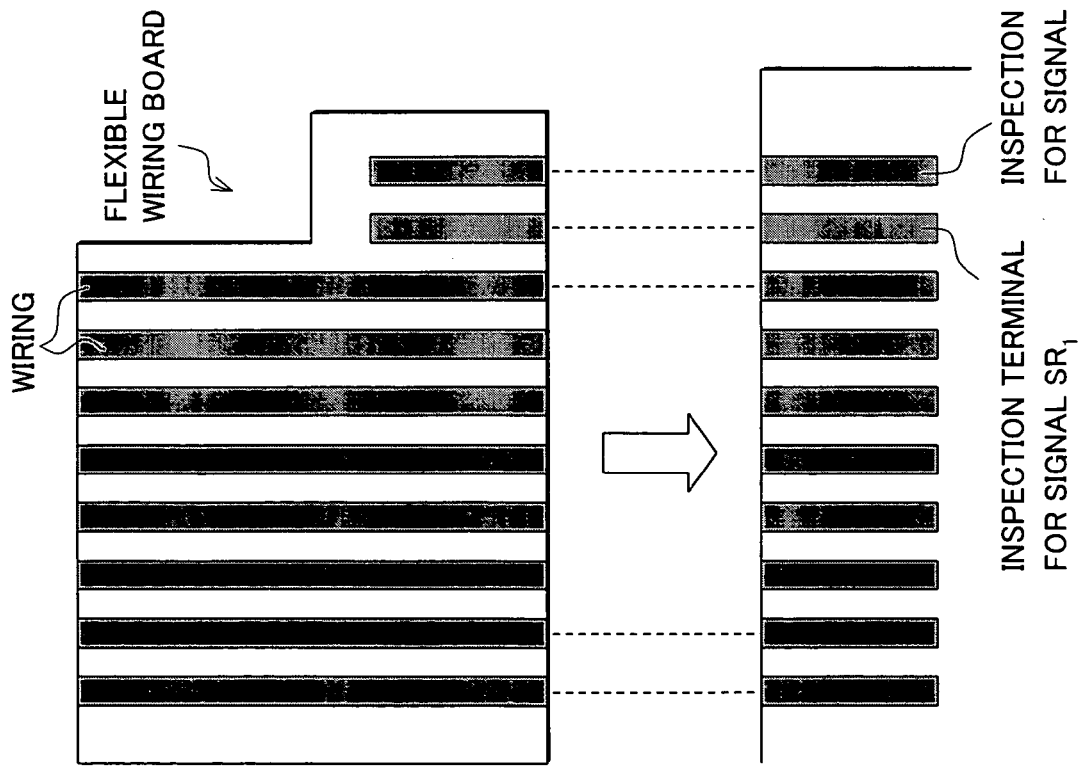
FIG. 24(a) is a plan view showing a conventional display device provided with two inspection terminals for verification of the operation of a bidirectional shift register before coupled to a flexible wiring board.
FIG. 24(b) is a plan view showing a conventional display device provided with one inspection terminal for verification of the operation of a bidirectional shift register before coupled to a flexible wiring board.
Figure 24:
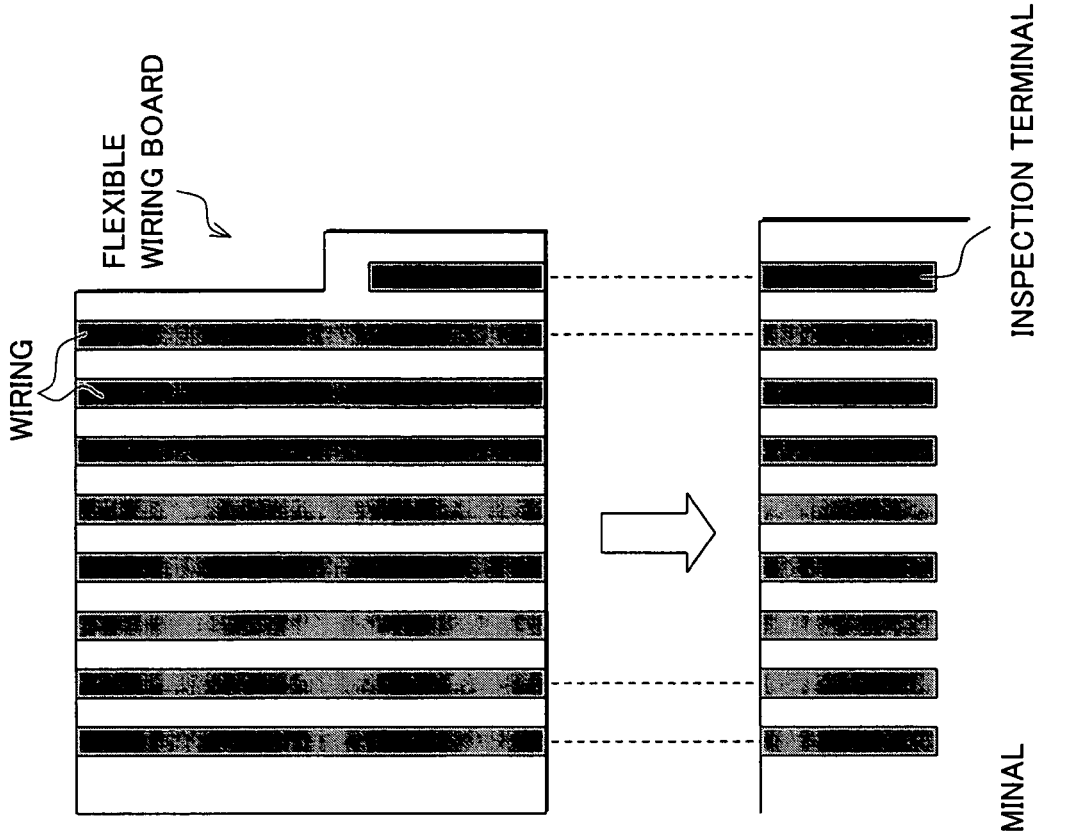
Figure 25:
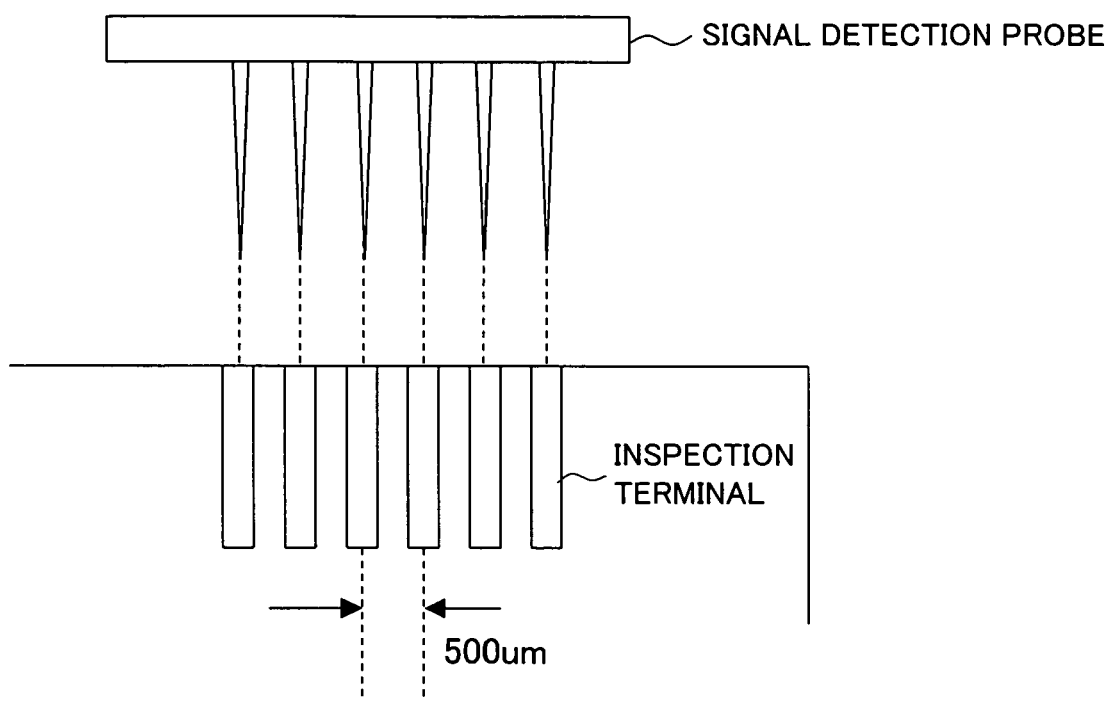
FIG. 25 is a plan view showing the inspection terminals before coupled to signal detection probes.
Figure 26:
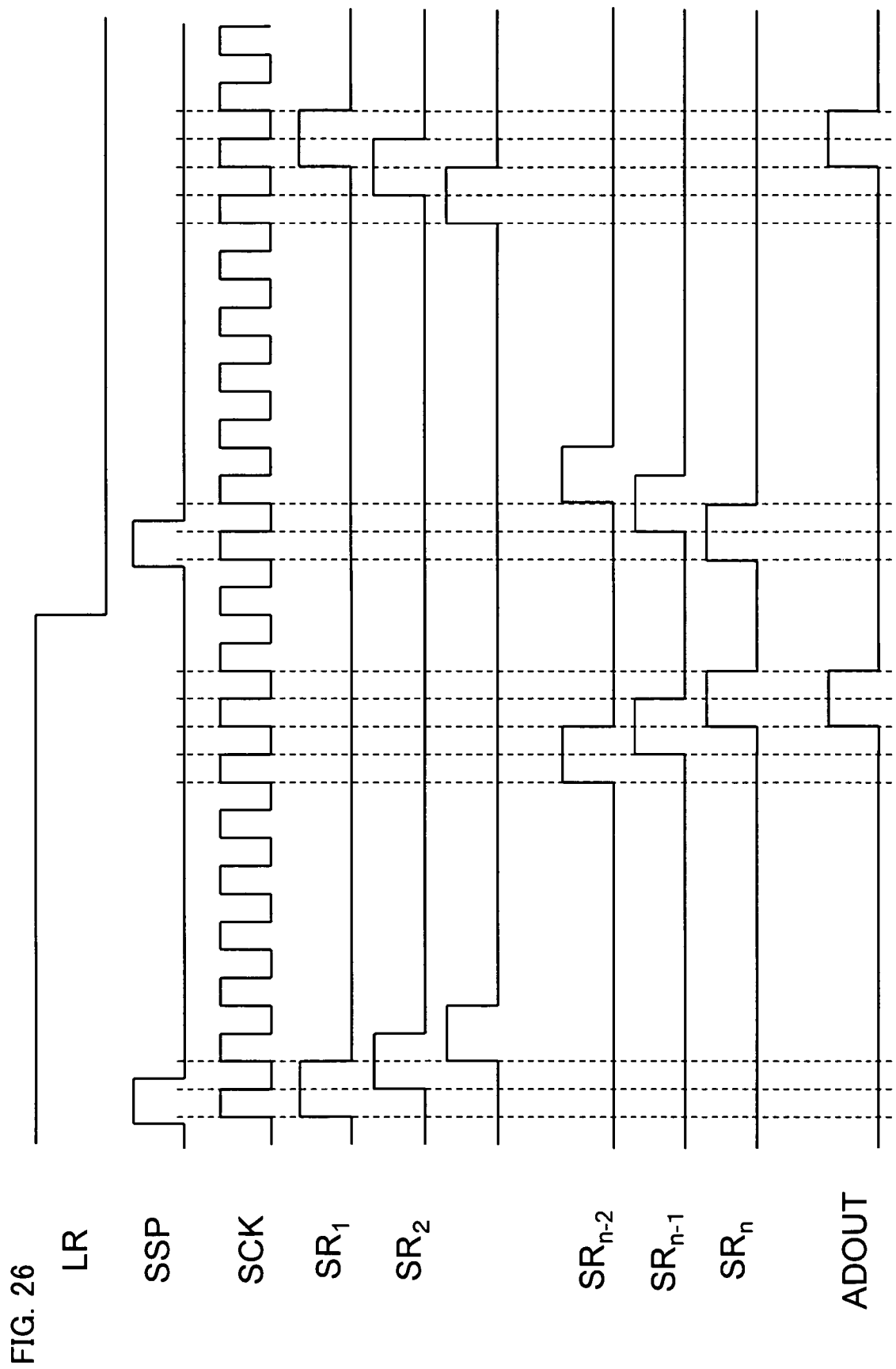
FIG. 26 is a timing chart showing an operation of the conventional bidirectional shift register.
Figure 27:
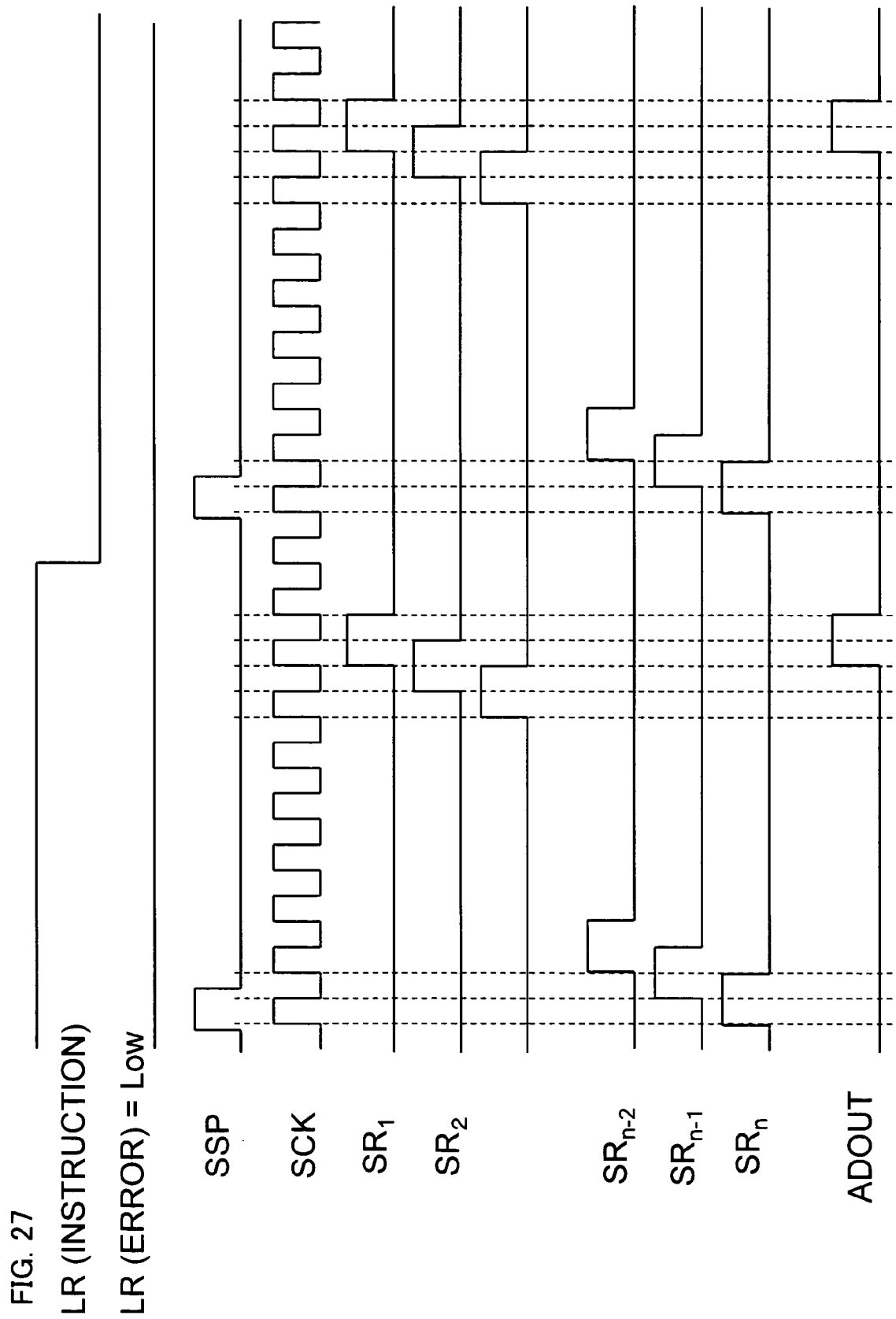
FIG. 27 is a timing chart when the horizontal instruction signal LR is fixed in LOW state due to, for example, a defect of internal circuitry of the conventional bidirectional shift register.
Figure 28:
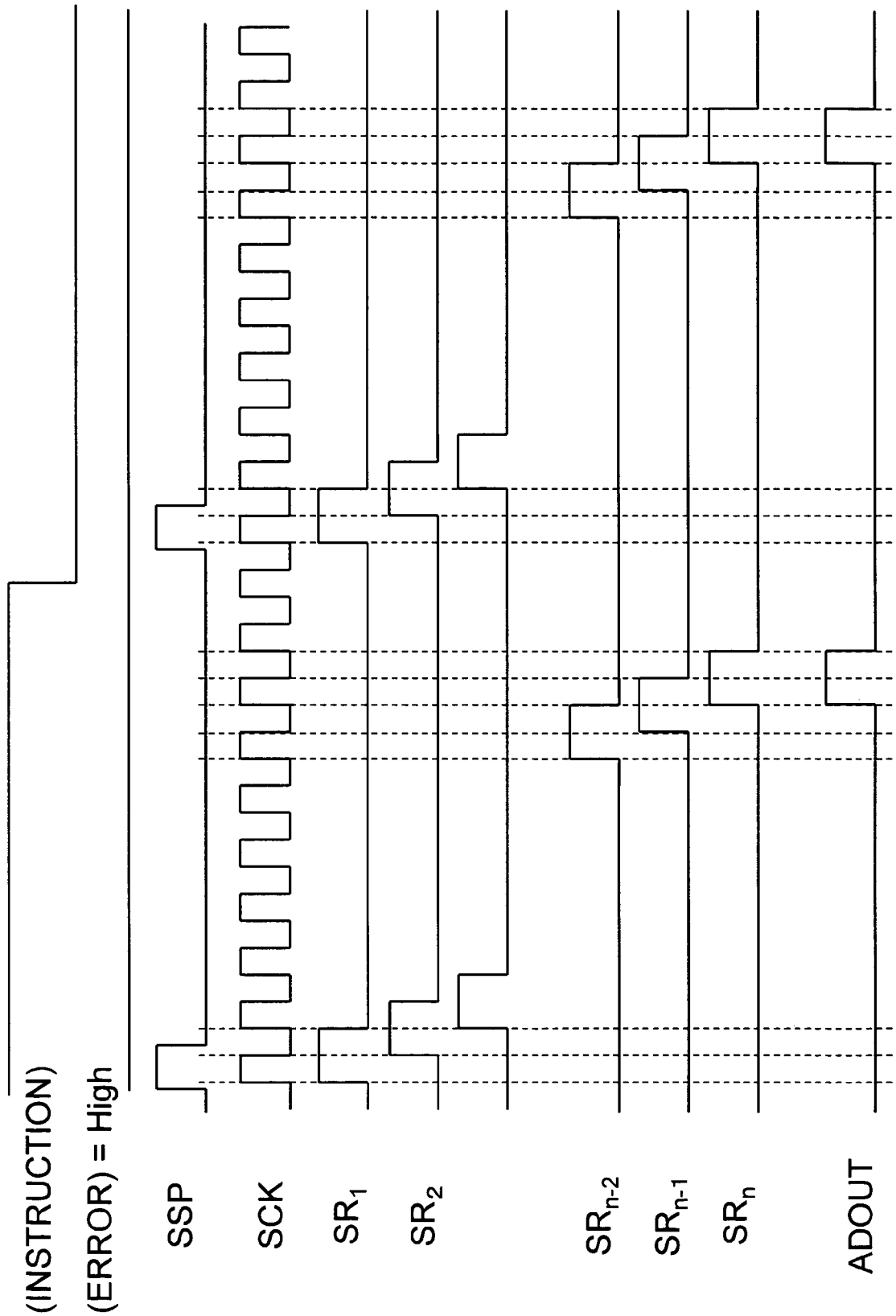
FIG. 28 is a timing chart when the horizontal instruction signal LR is fixed in HIGH state due to, for example, a defect of internal circuitry of the conventional bidirectional shift register.

As described in the BACKGROUND OF THE INVENTION section, the pulse signal $SR_1$ output of the shift register section 24 is directly input to the $IN_2$ of the inspection signal switching section 25 in the present embodiment (see FIG. 23). The waveform change section 26, which constitutes a feature of the present invention, will be detailed later.

The flip-flop $FF_n$, which outputs the pulse signal $SR_n$, in the description of the present embodiment corresponds to the flip-flop in the first predetermined stage in claims. The flip-flop $FF_1$, which outputs the pulse signal $SR_1$, corresponds to the flip-flop in the second predetermined stage in claims. The flip-flops in the first and second predetermined stages are by no means limited to the flip-flop $FF_n$ outputting the pulse signal $SR_n$ and the flip-flop $FF_1$ outputting the pulse signal $SR_1$ respectively.

The scan signal line drive circuit 3 includes a bidirectional shift register 31 and a buffer section 32. The buffer section 32 is identical to the buffer section 72 described in the BACKGROUND OF THE INVENTION section, and its description is therefore omitted here.

The bidirectional shift register 31 includes a shift register section (shift register means) 34, an inspection signal switching section first switching means) 35, and a waveform change section (first waveform change means) 36.

In the bidirectional shift register 31, a pulse signal $GL_m$ from the last output stage (or the first output stage) in the shift register section 34 is input to the inspection signal switching section 35 via the waveform change section 36. That is, when a vertical instruction signal UD is HIGH, the pulse signal $GL_m$ from the last output stage is input to the waveform change section 36; when the vertical instruction signal UD is LOW, the pulse signal $GL_m$ from the first output stage is input to the waveform change section 36.

The bidirectional shift register 31 is identical to the bidirectional shift register 71 described in the BACKGROUND OF THE INVENTION section, except that the pulse signal $GL_m$ from the last output stage (or the first output stage) is input to the inspection signal switching section 35 via the waveform change section 36. In other words, the shift register section 34 is identical to the shift register section 74 described in the BACKGROUND OF THE INVENTION section, whereas the inspection signal switching section 35 is identical to the inspection signal switching section 75 described in the BACKGROUND OF THE INVENTION section. The waveform change section 36 is identical to the waveform change section 26.

As mentioned earlier, the bidirectional shift register 21 has the same arrangement as the bidirectional shift register 31, except for the number of output signals. Comparing the display device 1 with the display device 51 described in the BACKGROUND OF THE INVENTION section, it would be revealed that the waveform change sections 26, 36 are new features in the display device 1. Further, as mentioned earlier, the waveform change section 36 has the same arrangement as the waveform change section 26.

The following description will therefore take the bidirectional shift register 21 containing the waveform change section 26 as an example.

Figure 2:
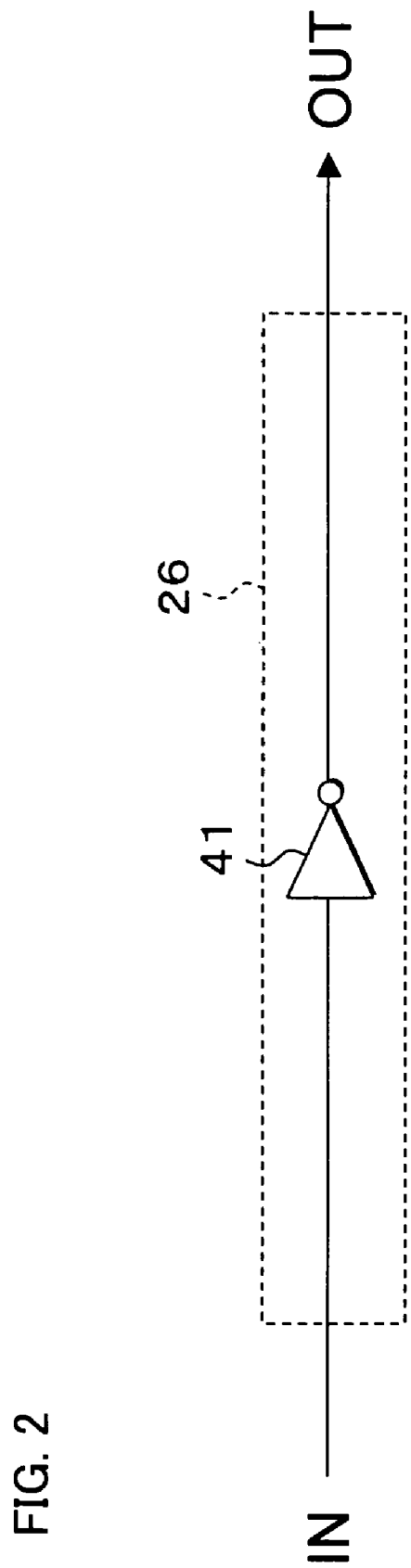
FIG. 2 is a circuit diagram showing an arrangement of a waveform change section in the bidirectional shift register.

FIG. 2 is a circuit diagram showing an arrangement of the waveform change section 26.

Referring to FIG. 2, the waveform change section 26 composed of a single-stage inverter 41. In the waveform change section 26, the inverter 41 inverts signal inputs at the IN for output to the OUT. The waveform change section 26 only needs to be arranged so as to be capable of inverting signal inputs at the IN in this manner, and is not limited to the single-stage inverter.

With the waveform change section 26 thus arranged, in the bidirectional shift register 21 in FIG. 1, the pulse signal $SR_n$ from the last (or first) output stage in the shift register section 24 is inverted by the waveform change section 26 and output to the $IN_1$ of the inspection signal switching section 25 (see FIG. 23).

More specifically, when the horizontal instruction signal LR is HIGH, the pulse signal $SR_n$ from the last output stage in the shift register section 24 is inverted by the waveform change section 26 and output to the inspection signal switching section 25. In contrast, when the horizontal instruction signal LR is LOW, the pulse signal $SR_n$ from the first output stage in the shift register section 24 is inverted by the waveform change section 26 and output to the inspection signal switching section 25.

Hereinafter, the output signal of the waveform change section 26 will be referred to as the "pulse signal $afSR_n$".

Figure 3:
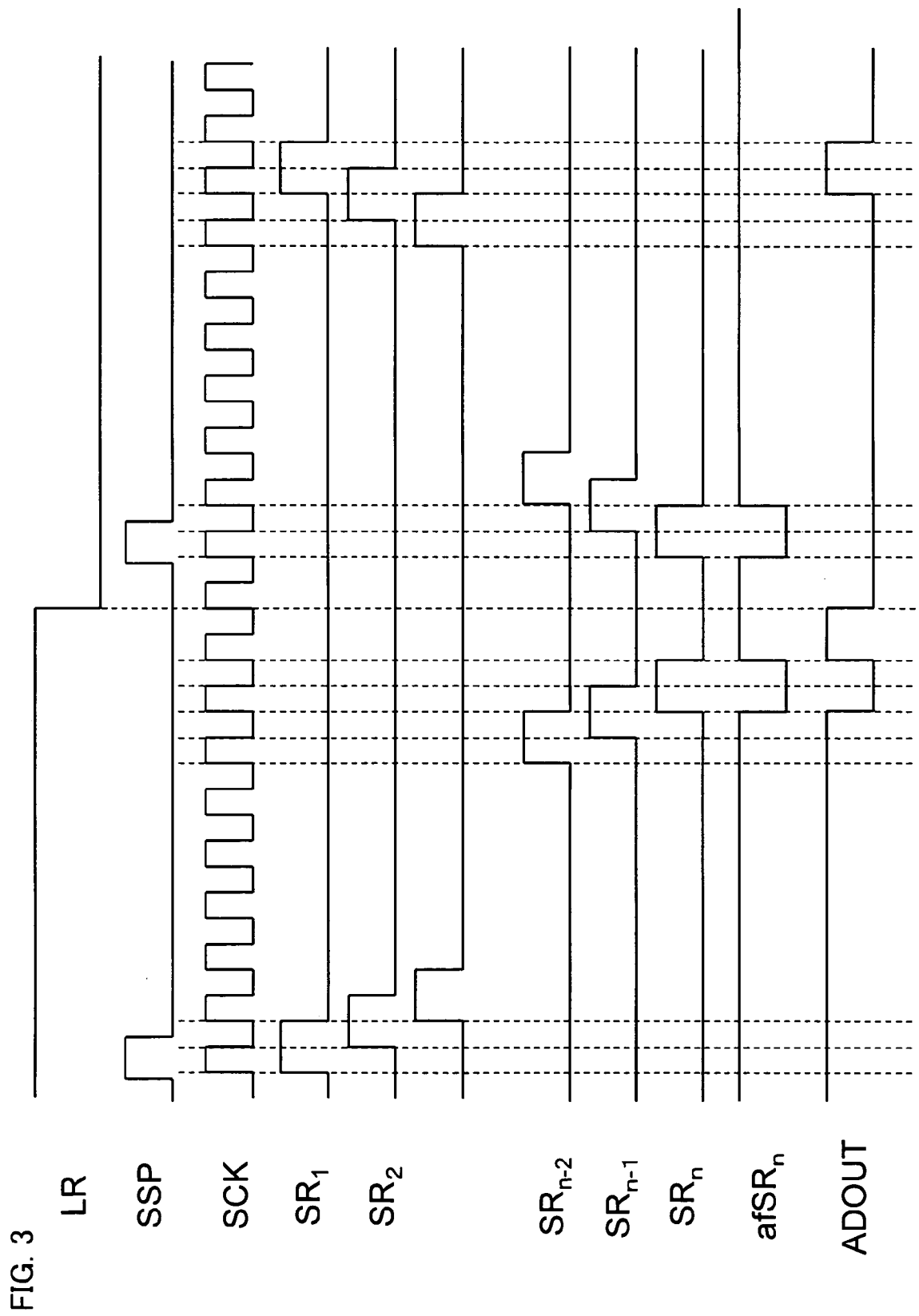
FIG. 3 is a timing chart showing an operation of the bidirectional shift register.

FIG. 3 is a timing chart showing an operation of the bidirectional shift register 21, particularly when the horizontal instruction signal LR changes from HIGH to LOW during an operation.

As shown in the figure, since the inspection signal switching section 25 is fed with a pulse signal $afSR_n$ which is an inversion of the pulse signal $SR_n$, the shift end signal ADOUT changes waveform in accordance with the state (HIGH or LOW) of the horizontal instruction signal LR for the following reasons.

As shown in the figure as well as FIG. 1, when the horizontal instruction signal LR is HIGH, the pulse signal $afSR_n$ is fed unchanged as a shift end signal ADOUT to external circuitry via the inspection signal switching section 25. This is because, as mentioned earlier, the stage outputting the pulse signal $SR_n$ is coupled to the $IN_1$ of the inspection signal switching section 25, and in the inspection signal switching section 25, the input signal at the $IN_1$ appears unchanged at the OUT when the horizontal instruction signal LR is HIGH.

When the horizontal instruction signal LR is LOW, the pulse signal $SR_1$ is fed unchanged as a shift end signal ADOUT to external circuitry. This is because, as mentioned earlier, the stage outputting the pulse signal $SR_1$ is coupled to the $IN_2$ of the inspection signal switching section 25, and in the inspection signal switching section 25, the input signal at the $IN_2$ appears unchanged at the OUT when the horizontal instruction signal LR is LOW.

In this manner, when the horizontal instruction signal LR is HIGH, the shift end signal ADOUT is identical to the pulse signal $afSR_n$; when the horizontal instruction signal LR is LOW, the shift end signal ADOUT is identical to the pulse signal $SR_1$.

Since the pulse signal $SR_1$ and the pulse signal $SR_n$ have the same waveform, the pulse signal $SR_1$ and the pulse signal $afSR_n$, which is the inversion of the pulse signal $SR_n$, have mutually differing waveforms.

In this manner, the waveform of the shift end signal ADOUT changes with the state of the horizontal instruction signal LR.

Therefore, the use of the bidirectional shift register 21 in accordance with the present embodiment produces effects which will be detailed later.

Figure 4:
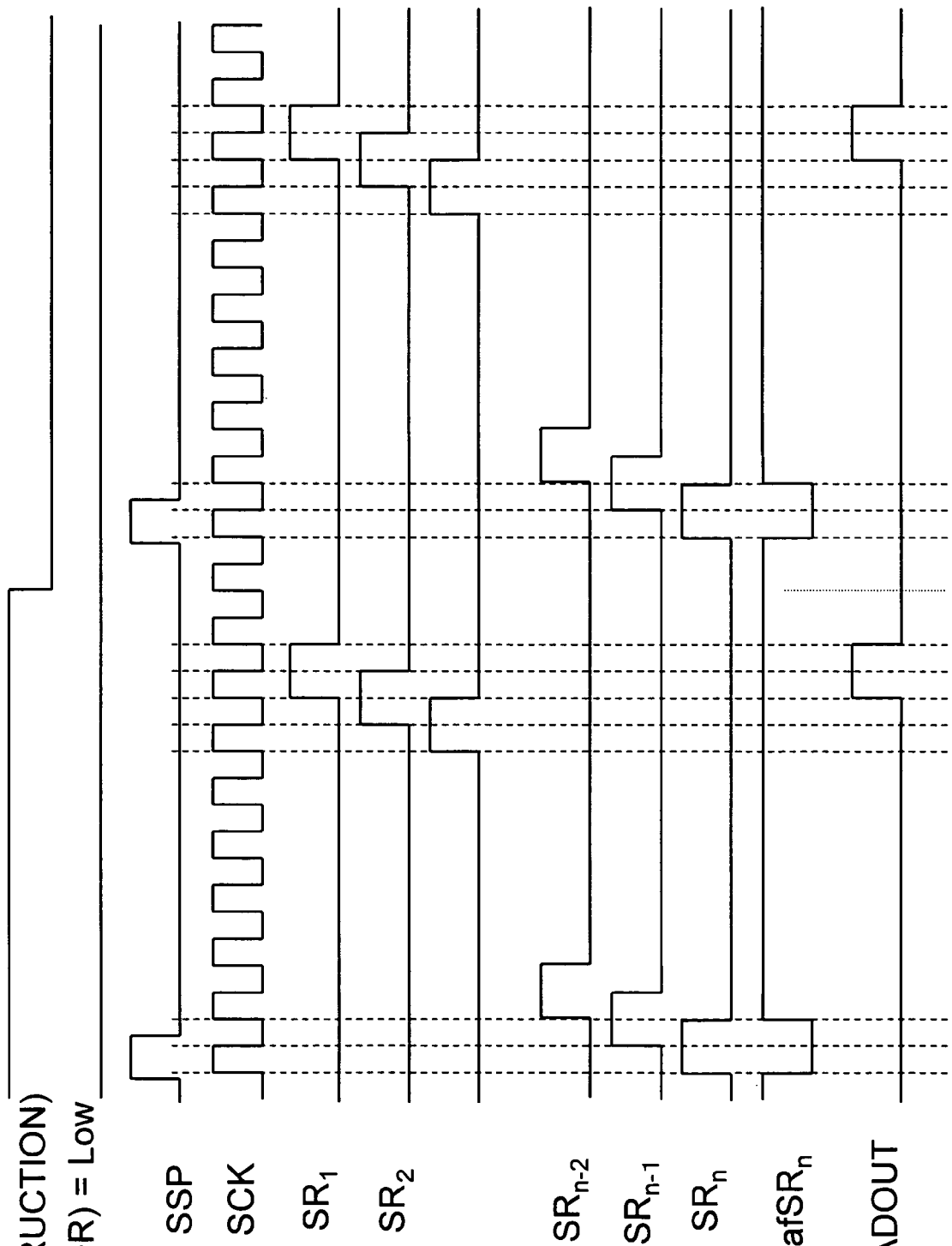
FIG. 4 is a timing chart when the horizontal instruction signal LR is fixed in LOW state due to, for example, a defect of internal circuitry of the bidirectional shift register.

FIG. 4 is timing chart when the horizontal instruction signal LR is fixed in LOW state due to, for example, a defect of internal circuitry of the bidirectional shift register 21 although the register 21 has received an external instruction to change the state of the horizontal instruction signal LR.

When this is the case, as shown in the figure, the resultant shift end signal ADOUT has a different waveform from when the bidirectional shift register 21 is in normal operation (see FIG. 3).

This is because, as mentioned earlier, (i) the waveform of the shift end signal ADOUT changes with the state of the horizontal instruction signal LR while the bidirectional shift register 21 is in normal operation, and (ii) the waveform of the shift end signal ADOUT is fixed while the horizontal instruction signal LR remains unchanged in LOW state.

Therefore, with the FIG. 3 waveform of the shift end signal ADOUT being recognized as the normal waveform in advance, a FIG. 4 waveform of the shift end signal ADOUT can be safely determined to be an indication of a defect of the bidirectional shift register 21.

Figure 5:
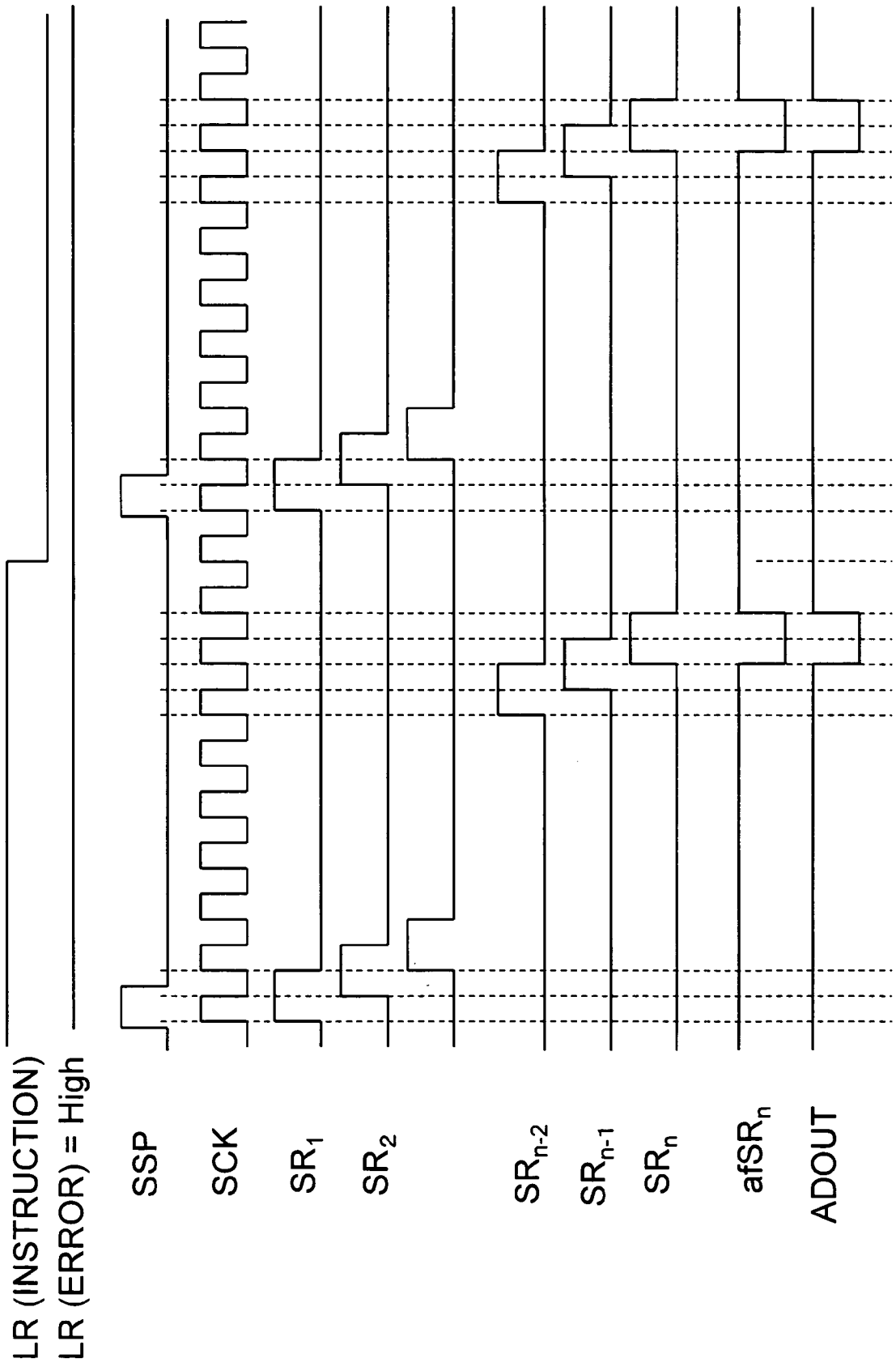
FIG. 5 is a timing chart when the horizontal instruction signal LR is fixed in HIGH state due to, for example, a defect of internal circuitry of the bidirectional shift register.

FIG. 5 is a timing chart when the horizontal instruction signal LR is fixed in HIGH state due to, for example, a defect of internal circuitry of the bidirectional shift register 21 although the register 21 has received an external instruction to change the state of the horizontal instruction signal LR.

When this is the case, as shown in the figure, the resultant shift end signal ADOUT again has a different waveform from when the bidirectional shift register 21 is in normal operation (see FIG. 3).

Therefore, with the FIG. 3 waveform of the shift end signal ADOUT being recognized as the normal waveform in advance, a FIG. 5 waveform of the shift end signal ADOUT can be safely determined to be an indication of a defect of the bidirectional shift register 21.

For these reasons, a bidirectional shift register is provided which can be determined to be operating normally or otherwise in both directions without added inspection terminals. In addition, prior to the liquid crystal step described in the BACKGROUND OF THE INVENTION section, the bidirectional shift register 21 can be determined to be operating normally or otherwise in both directions. Thus, the manufacturing cost of a display device 1 incorporating the bidirectional shift register 21 is reducible.

Incidentally, the waveform change section 26 is not limited to the single-stage inverter arrangement in FIG. 2. Other arrangement examples for the waveform change section 26 will be now described in reference to FIG. 6 through FIG. 13.

Figure 6:
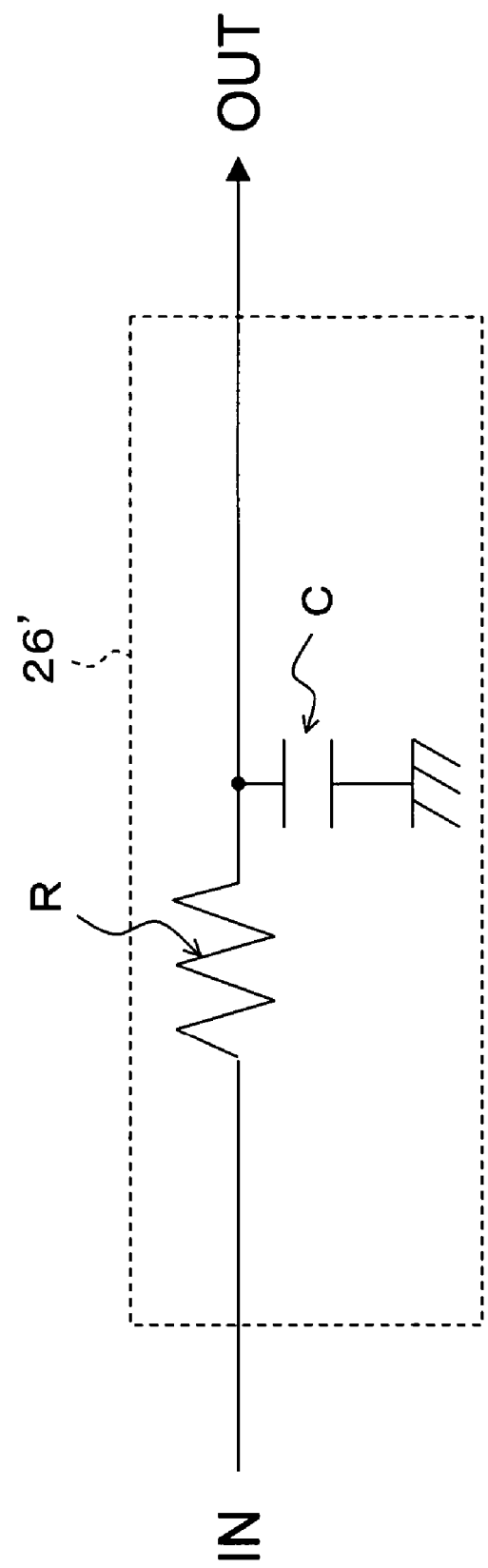
FIG. 6 is a circuit diagram showing another arrangement of the waveform change section.

FIG. 6 is a circuit diagram showing a waveform change section 26' which is another arrangement example for the waveform change section 26.

As shown in the figure, the waveform change section 26' is composed of a capacitor C and a resistor R. More specifically, an input signal to the waveform change section 26' is output via the resistor R. The capacitor C is coupled to the downstream side of the resistor R at one end and grounded at the other.

Figure 7:
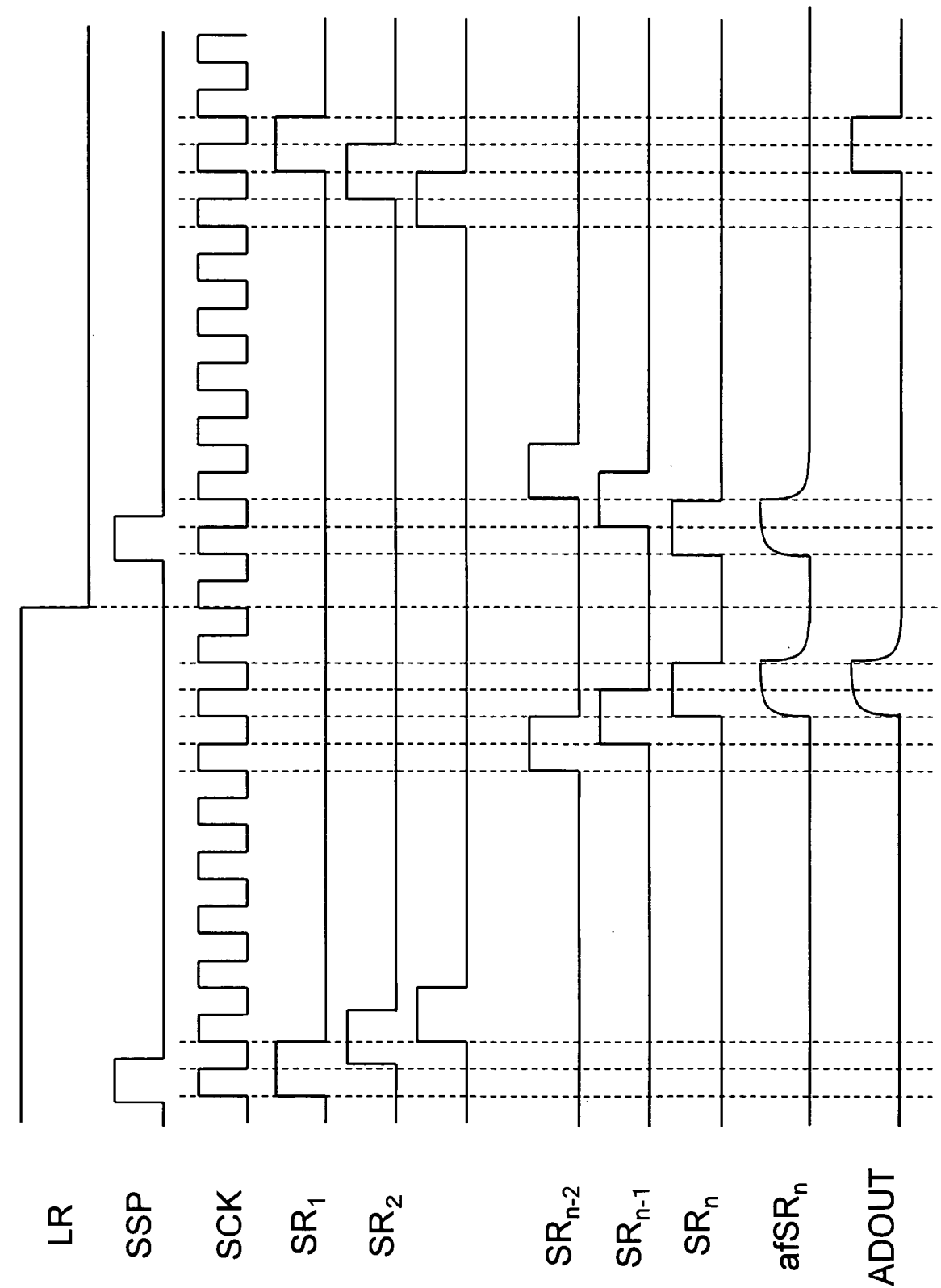
FIG. 7 is a timing chart showing an operation of a bidirectional shift register with a waveform change section having the other arrangement.

FIG. 7 is a timing chart showing an operation of a bidirectional shift register 21 incorporating the waveform change section 26', particularly when the horizontal instruction signal LR changes from HIGH to LOW during an operation.

In this case, the pulse signal afSR$_n$, which is the output of the waveform change section 26', has a different waveform from the pulse signal SR$_n$, which is the input of the waveform change section 26'. This is because of the arrangement of the waveform change section 26' where the resistor R and the capacitor (capacitive load section) C are included. The arrangement changes the input waveform of the waveform change section 26' before the waveform is output from the waveform change section 26'. Specifically, since the waveform change section 26' receives a rectangular signal, the output signal has a waveform with more rounded rise and fall edges (hereinafter, "distorted waveform"). The waveform change section 26' only needs to be capable of distorting the input signal waveform at the IN in this manner, and is not limited to the resistor R and the capacitor C.

Thus, when the horizontal instruction signal LR is HIGH, the pulse signal afSR$_n$ with a distorted waveform is output as a shift end signal ADOUT. In contrast, when the horizontal instruction signal LR is LOW, a rectangular pulse signal SR$_1$ is output.

In this manner, the waveform of the shift end signal ADOUT changes with the state of the horizontal instruction signal LR.

Therefore, the use of a bidirectional shift register 21 incorporating the waveform change section 26' also produces effects which will be detailed later.

Figure 8:
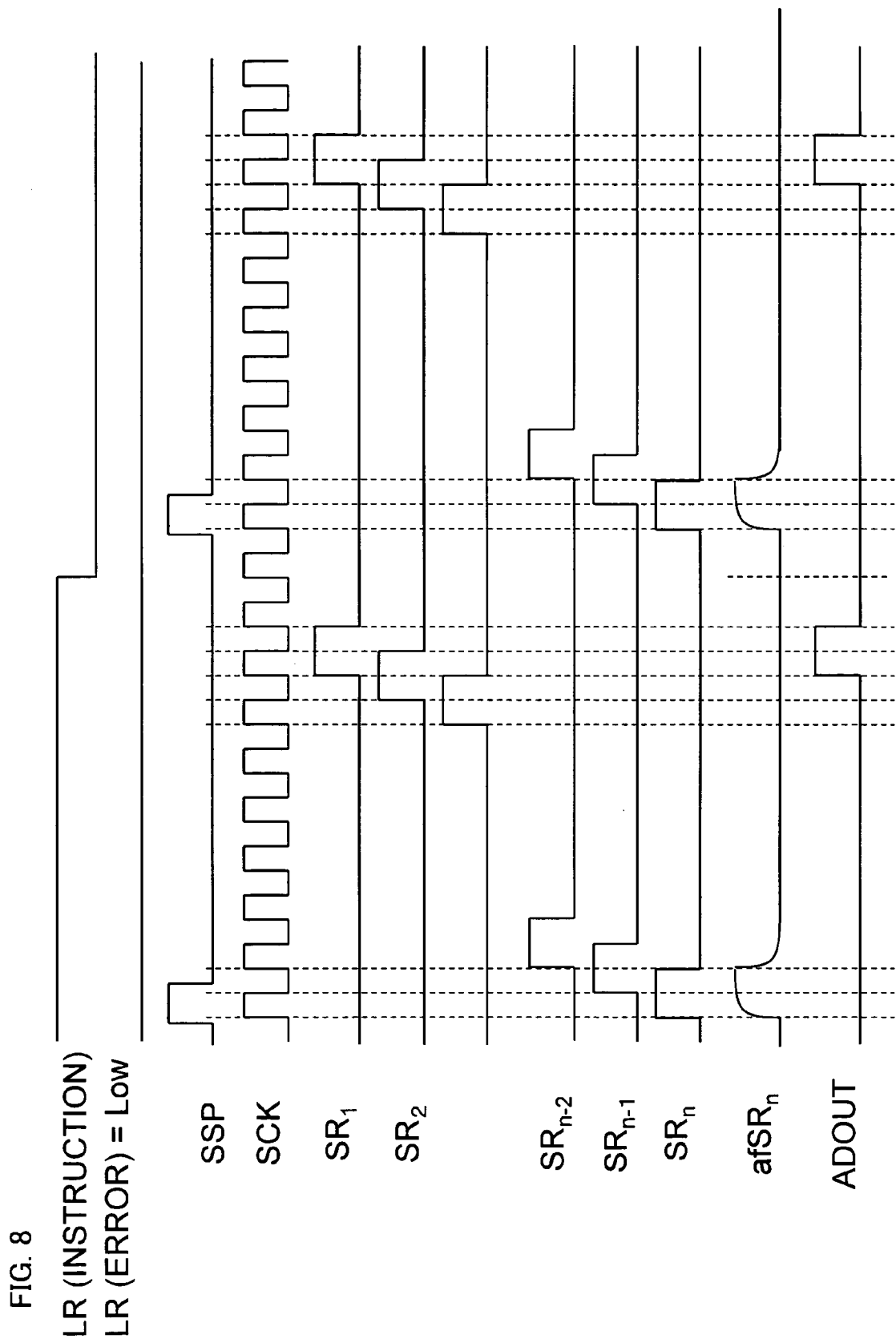
FIG. 8 is a timing chart when the horizontal instruction signal LR is fixed in LOW state due to, for example, a defect of internal circuitry of the bidirectional shift register with a waveform change section having the other arrangement.

FIG. 8 is a timing chart when the horizontal instruction signal LR is fixed in LOW state due to, for example, a defect of internal circuitry of the bidirectional shift register 21 incorporating the waveform change section 26' although the register 21 has received an external instruction to change the state of the horizontal instruction signal LR.

When this is the case, as shown in the figure, the resultant shift end signal ADOUT again has a different waveform from when the bidirectional shift register 21 is in normal operation (see FIG. 7).

This is because, as mentioned earlier, (i) the waveform of the shift end signal ADOUT changes with the state of the horizontal instruction signal LR while the bidirectional shift register 21 is in normal operation, and (ii) the waveform of the shift end signal ADOUT is fixed while the horizontal instruction signal LR remains unchanged in LOW state.

Therefore, with the FIG. 7 waveform of the shift end signal ADOUT being recognized as the normal waveform in advance, a FIG. 8 waveform of the shift end signal ADOUT can be safely determined to be an indication of a defect of the bidirectional shift register 21.

Figure 9:
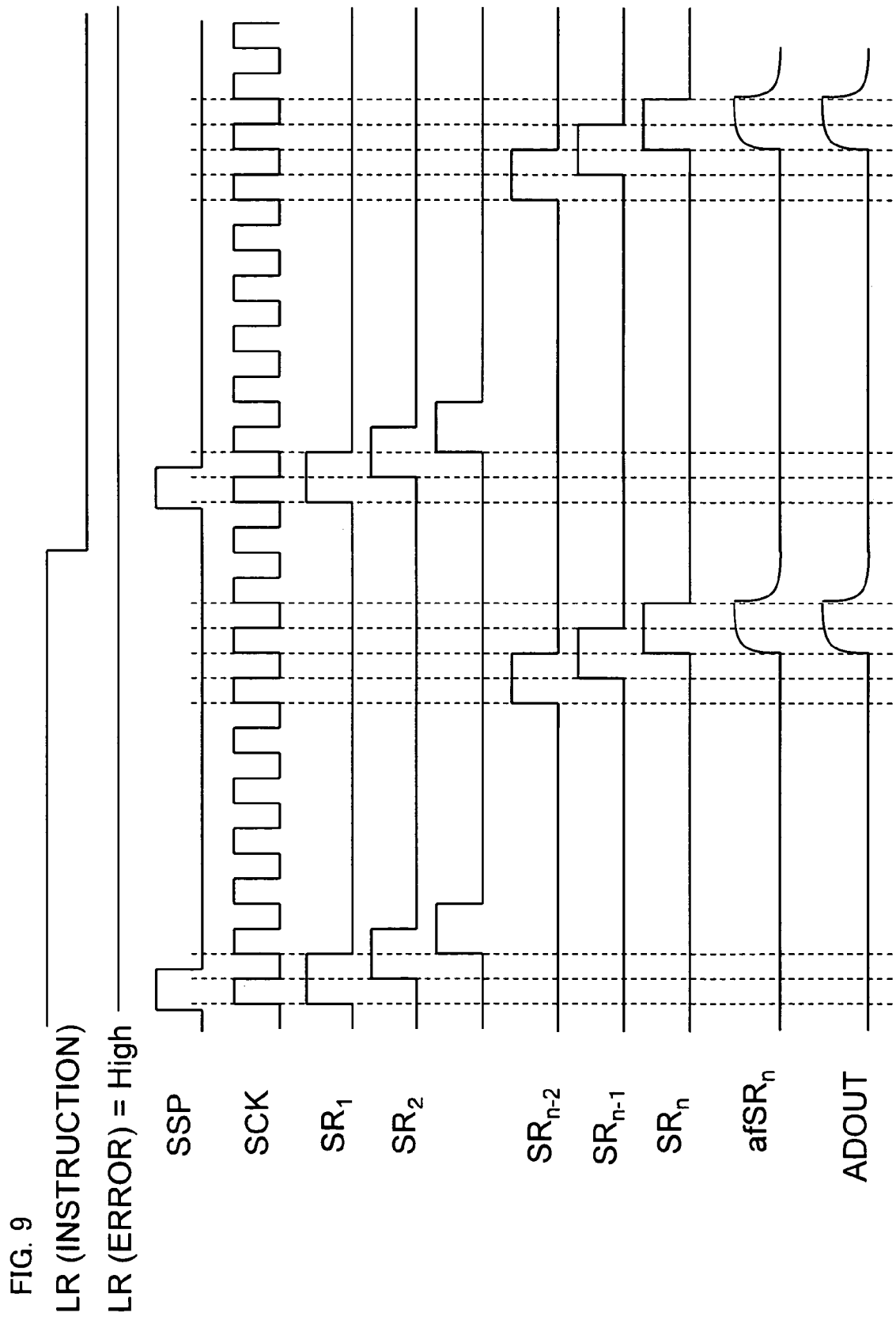
FIG. 9 is a timing chart when the horizontal instruction signal LR is fixed in HIGH state due to, for example, a defect of internal circuitry of the bidirectional shift register with a waveform change section having the other arrangement.

FIG. 9 is a timing chart when the horizontal instruction signal LR is fixed in HIGH state due to, for example, a defect of internal circuitry of the bidirectional shift register 21 incorporating the waveform change section 26' although the register 21 has received an external instruction to change the state of the horizontal instruction signal LR.

When this is the case, as shown in the figure, the resultant shift end signal ADOUT again has a different waveform from when the bidirectional shift register 21 is in normal operation (see FIG. 7).

Therefore, with the FIG. 7 waveform of the shift end signal ADOUT being recognized as the normal waveform in advance, a FIG. 9 waveform of the shift end signal ADOUT can be safely determined to be an indication of a defect of the bidirectional shift register 21.

For these reasons, a bidirectional shift register is provided which can be determined to be operating normally or otherwise in both directions without providing additional inspection terminals on the waveform change section 26'. In addition, prior to the liquid crystal step described in the BACKGROUND OF THE INVENTION section, the bidirectional shift register 21 can be determined to be operating normally or otherwise in both directions. Thus, the manufacturing cost of a display device 1 incorporating the bidirectional shift register 21 is reducible.

Figure 10:
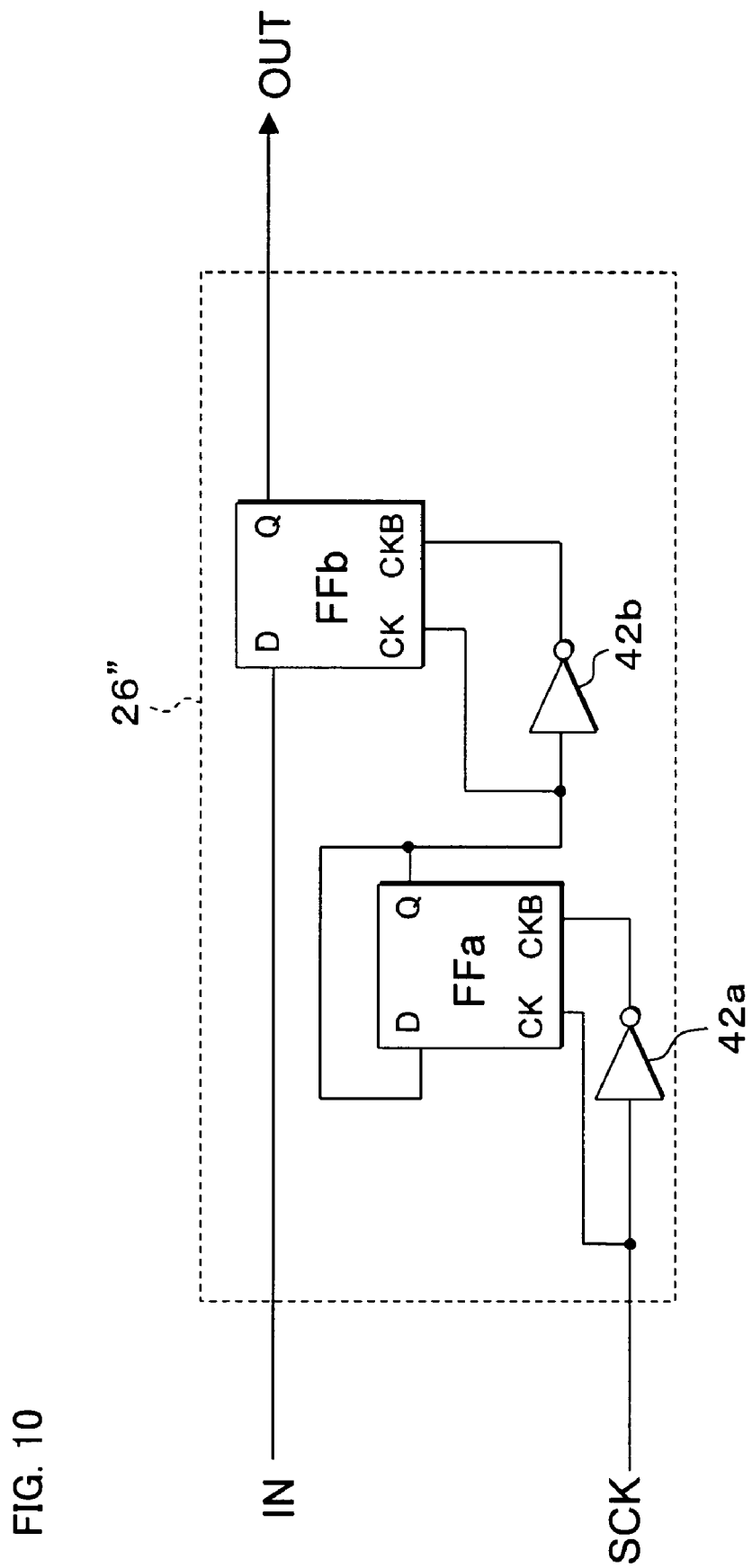
FIG. 10 is a circuit diagram showing a further arrangement of the waveform change section.

FIG. 10 is a circuit diagram showing a waveform change section 26" which is a further arrangement example for the waveform change section 26.

As shown in the figure, the waveform change section 26" is composed of two flip-flops FF$_a$, FF$_b$ and two inverters 42a, 42b. The horizontal clock signal SCK is fed to the waveform change section 26".

The arrangement halves the frequency of the horizontal clock signal SCK, producing a signal 2TSCK which has a pulse width twice that of the input pulse signal of the waveform change section 26". More specifically, a first circuit (frequency divide means) containing the flip-flop FF$_a$ and the inverter 42a halves the frequency of the horizontal clock signal SCK. A second circuit containing the flip-flop FF$_b$ and the inverter 42b doubles the pulse width of the frequency-halved signal to twice that of the input pulse signal of the waveform change section 26".

Figure 11:
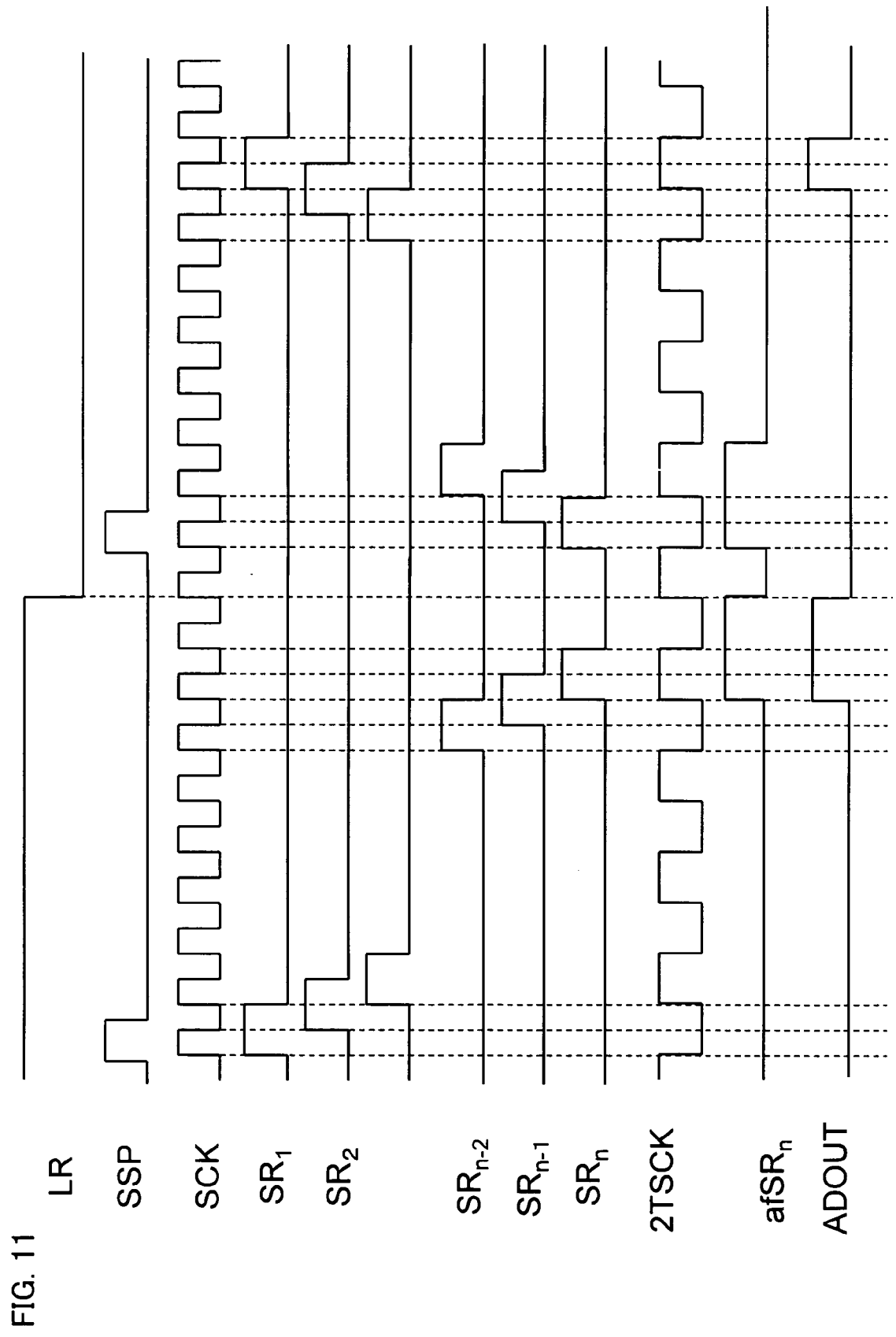
FIG. 11 is a timing chart showing an operation of a bidirectional shift register with a waveform change section having the further arrangement.

FIG. 11 is a timing chart showing an operation of a bidirectional shift register 21 incorporating the waveform change section 26", particularly when the horizontal instruction signal LR changes from HIGH to LOW during an operation.

Due to the arrangement of the waveform change section 26", as shown in the figure, the output pulse signal afSR$_n$ of the waveform change section 26" has a pulse width twice that of the input pulse signal SR$_n$ of the waveform change section 26". The waveform change section 26" only needs to be capable of altering the pulse width of the input signal at the IN as in the foregoing, and is not limited to the arrangement.

Therefore, when the horizontal instruction signal LR is HIGH, the pulse signal afSR$_n$ having a pulse width twice that of the pulse signal SR$_n$ is output as a shift end signal ADOUT. In contrast, when the horizontal instruction signal LR is LOW, the output pulse signal SR$_1$ has the same pulse width as the pulse signal SR$_n$.

In this manner, the waveform of the shift end signal ADOUT changes with the state of the horizontal instruction signal LR.

Therefore, the use of a bidirectional shift register 21 incorporating the waveform change section 26" also produces effects which will be detailed later.

Figure 12:
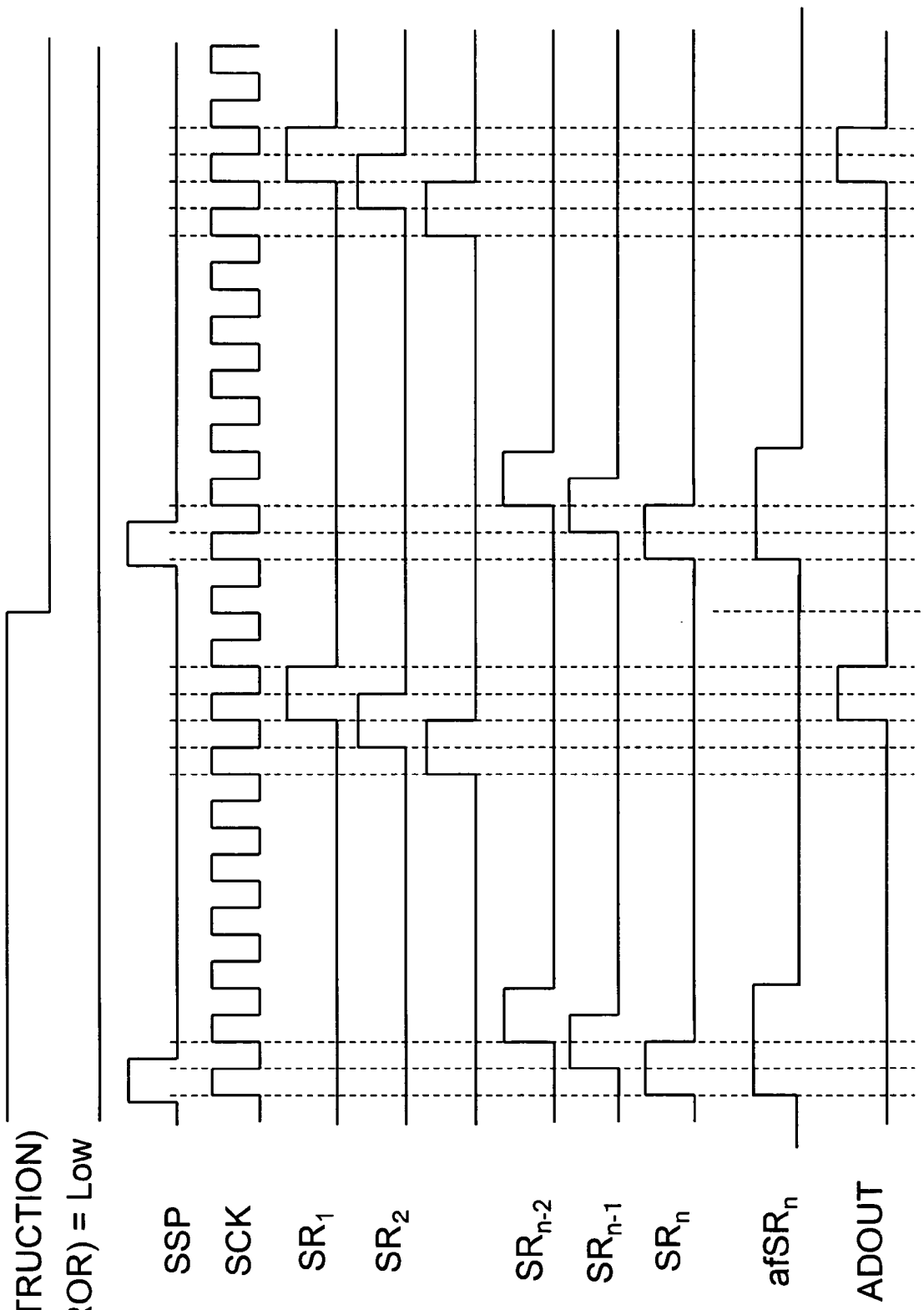
FIG. 12 is a timing chart when the horizontal instruction signal LR is fixed in LOW state due to, for example, a defect of internal circuitry of the bidirectional shift register with a waveform change section having the further arrangement.

FIG. 12 is a timing chart when the horizontal instruction signal LR is fixed in LOW state due to, for example, a defect of internal circuitry of the bidirectional shift register 21 incorporating the waveform change section 26" although the register 21 has received an instruction to change the state of the horizontal instruction signal LR.

When this is the case, as shown in the figure, the resultant shift end signal ADOUT again has a different waveform from when the bidirectional shift register 21 is in normal operation (see FIG. 11).

This is because, as mentioned earlier, (i) the waveform of the shift end signal ADOUT changes with the state of the horizontal instruction signal LR while the bidirectional shift register 21 is in normal operation, and (ii) the waveform of the shift end signal ADOUT is fixed when the horizontal instruction signal LR remains unchanged in LOW state.

Therefore, with the FIG. 11 waveform of the shift end signal ADOUT being recognized as the normal waveform in advance, a FIG. 12 waveform of the shift end signal ADOUT can be safely determined to be an indication of a defect of the bidirectional shift register 21.

Figure 13:
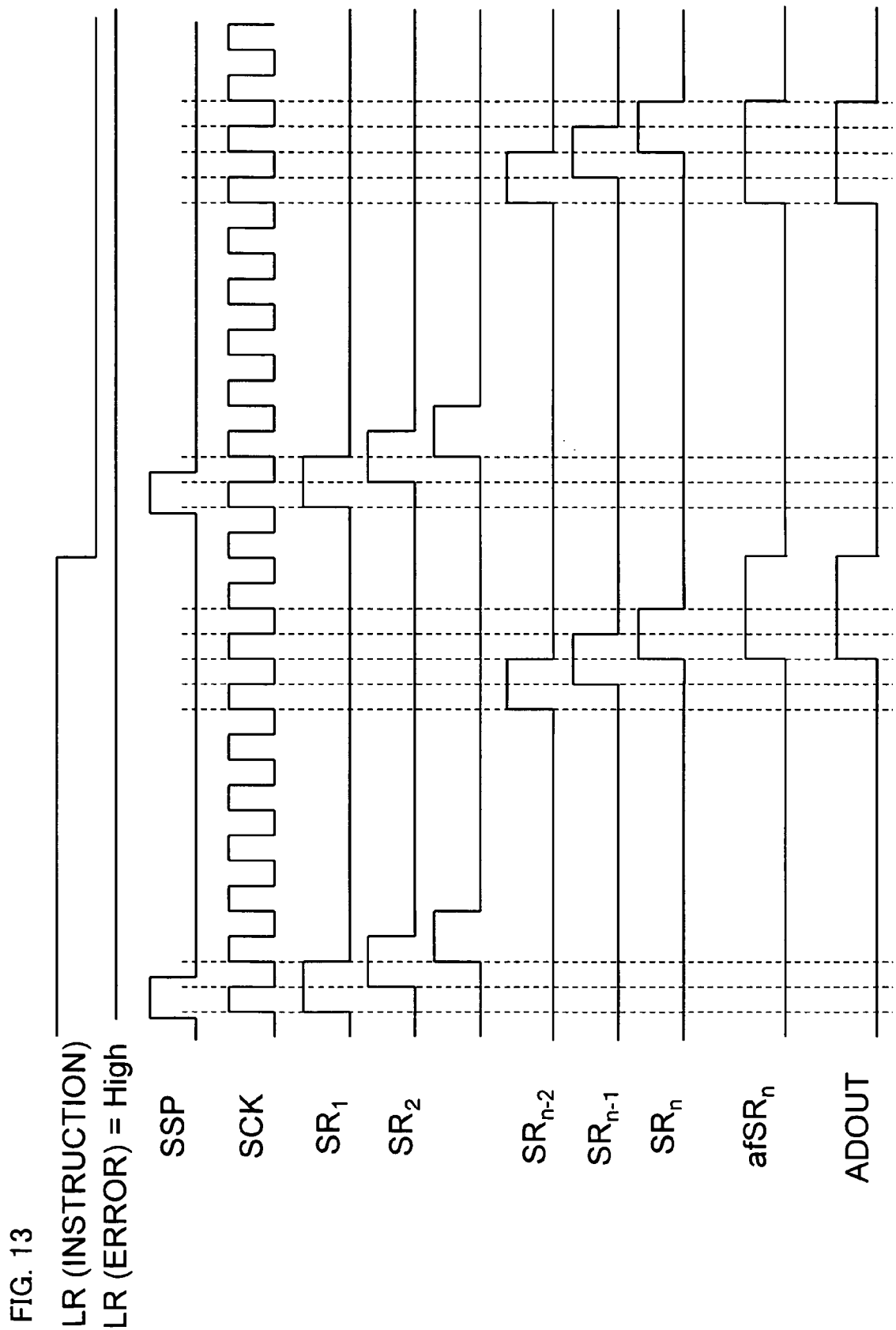
FIG. 13 is a timing chart when the horizontal instruction signal LR is fixed in HIGH state due to, for example, a defect of internal circuitry of a bidirectional shift register with yet another waveform change section.

FIG. 13 is a timing chart when the horizontal instruction signal LR is fixed in HIGH state due to, for example, a defect of internal circuitry of the bidirectional shift register 21 incorporating the waveform change section 26" although the register 21 has received an instruction to change the state of the horizontal instruction signal LR.

When this is the case, as shown in the figure, the resultant shift end signal ADOUT again has a different waveform from when the bidirectional shift register 21 is in normal operation (see FIG. 11).

Therefore, with the FIG. 11 waveform of the shift end signal ADOUT being recognized as the normal waveform in advance, a FIG. 13 waveform of the shift end signal ADOUT can be safely determined to be an indication of a defect of the bidirectional shift register 21.

For these reasons, a bidirectional shift register is provided which can be determined to be operating normally or otherwise in both directions without providing additional inspection terminals on the waveform change section 26". In addition, prior to the liquid crystal step described in the BACKGROUND OF THE INVENTION section, the bidirectional shift register 21 can be determined to be operating normally or otherwise in both directions. Thus, the manufacturing cost of a display device 1 incorporating the bidirectional shift register 21 is reducible.

The foregoing description assumed that the output pulse signal $SR_n$ of the shift register section 24 was fed to the waveform change section (26, 26', 26"). This is not the only possibility.

Figure 14:
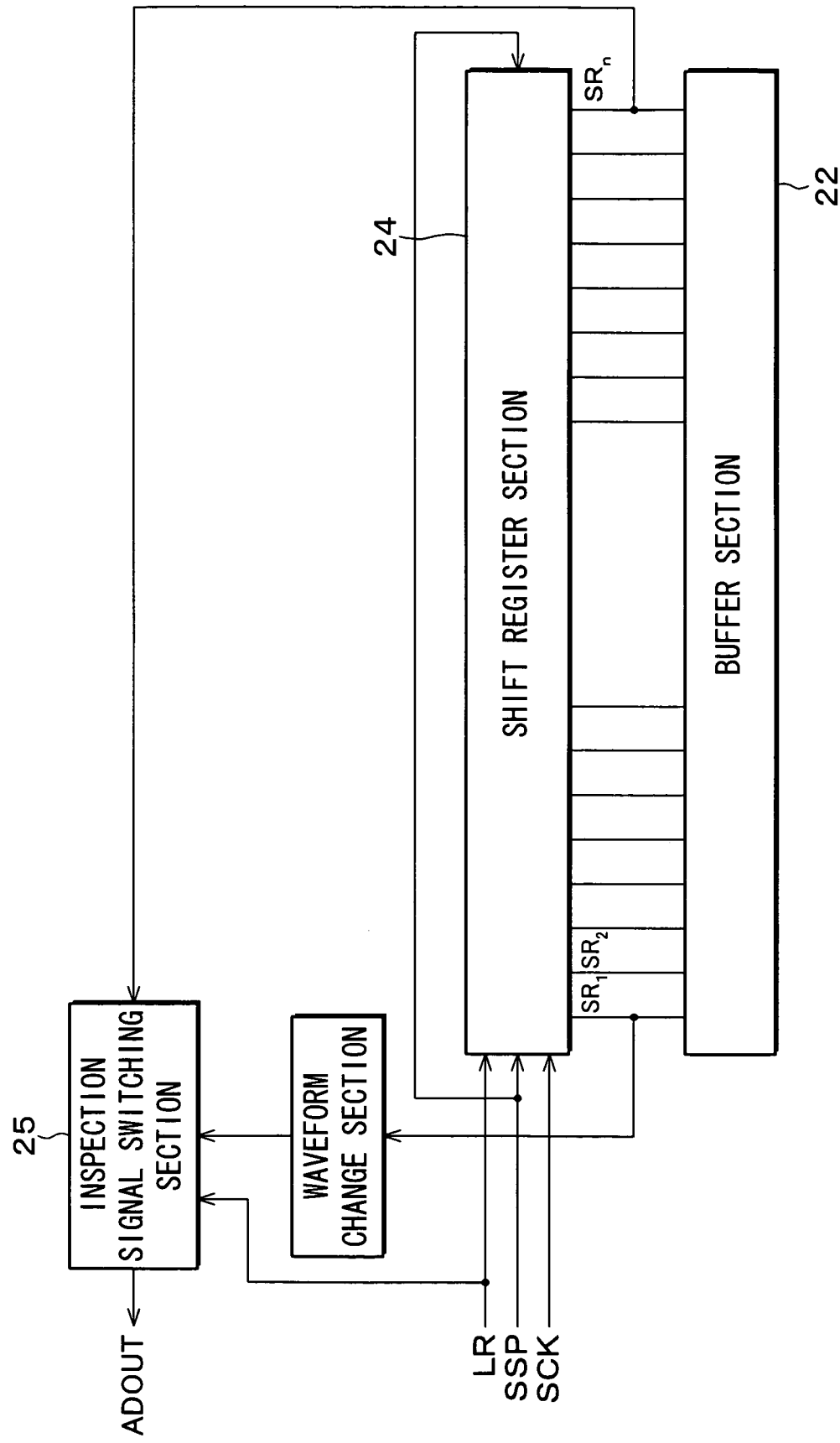
FIG. 14 is a block diagram showing another arrangement of the bidirectional shift register.

For example, the waveform change section (26, 26', 26") may be connected differently to the shift register section 24 as shown in FIG. 14, so that the output pulse signal $SR_1$ of the shift register section 24 is fed to the waveform change section (26, 26', 26").

Figure 15:
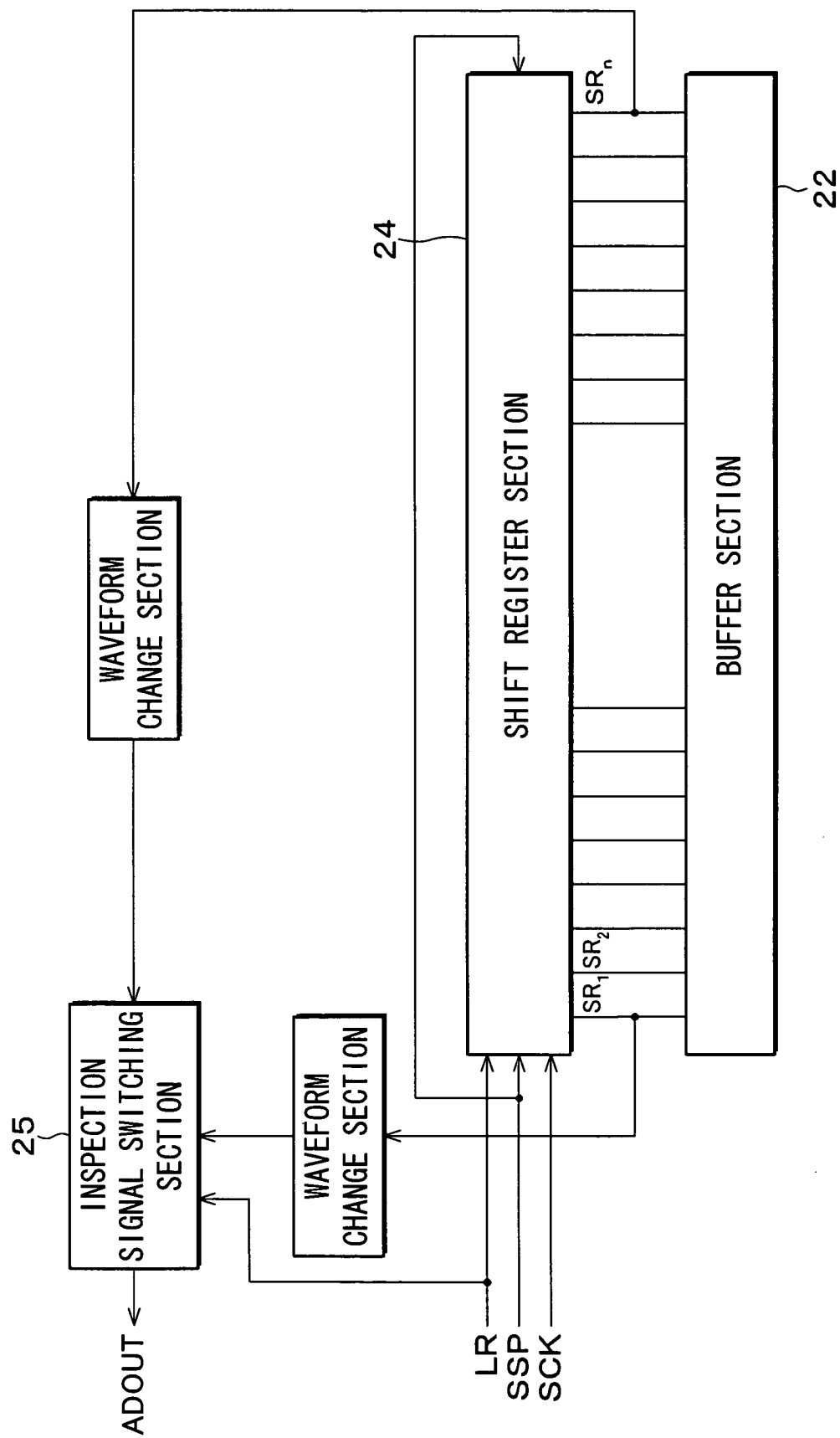
FIG. 15 is a block diagram showing a further arrangement of the bidirectional shift register.
Figure 16:
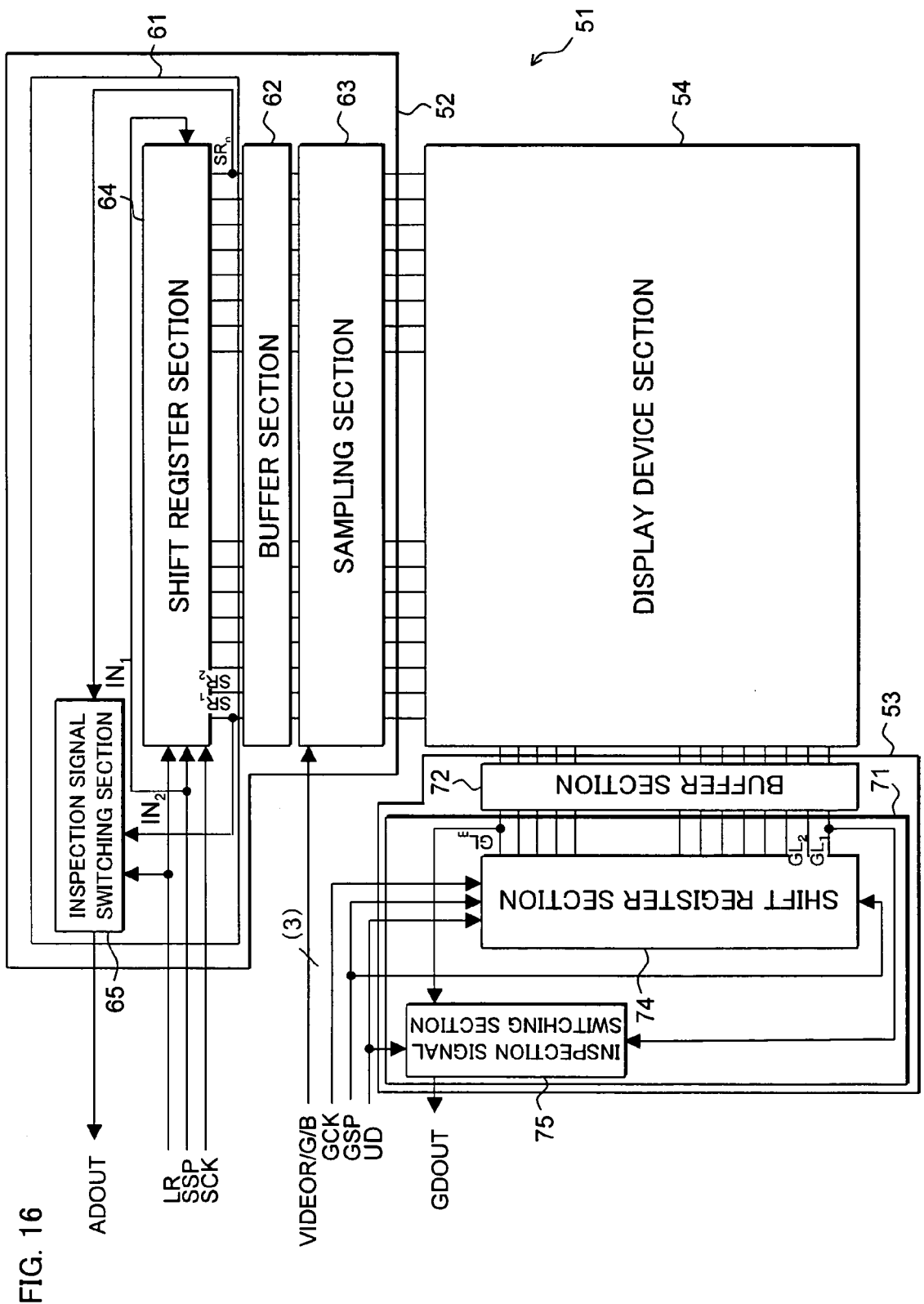
FIG. 16 is a block diagram showing a display device incorporating a conventional bidirectional shift register.
Figure 17:
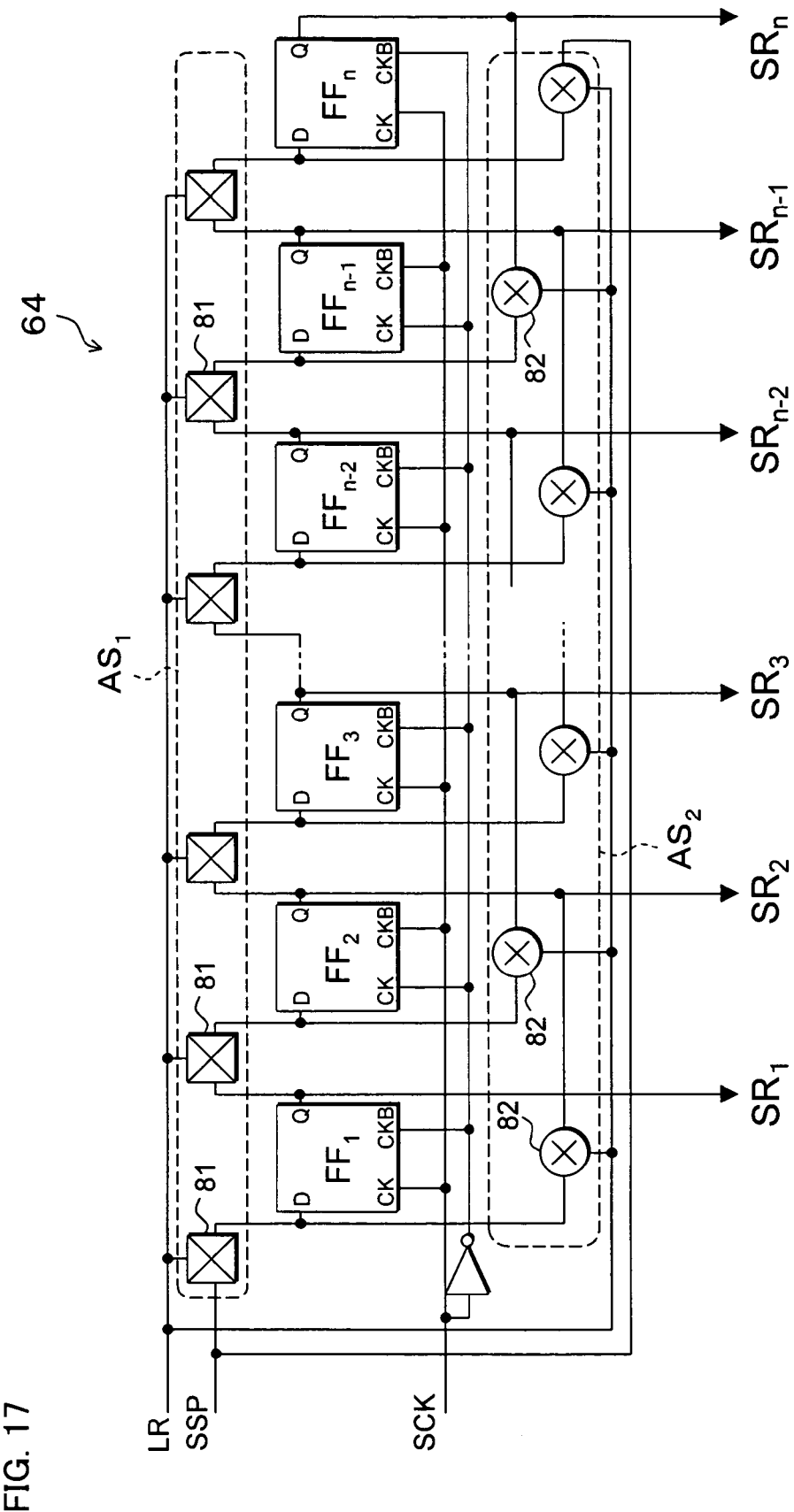
FIG. 17 is a circuit diagram showing an arrangement of a shift register section in the conventional bidirectional shift register.
Figure 18:
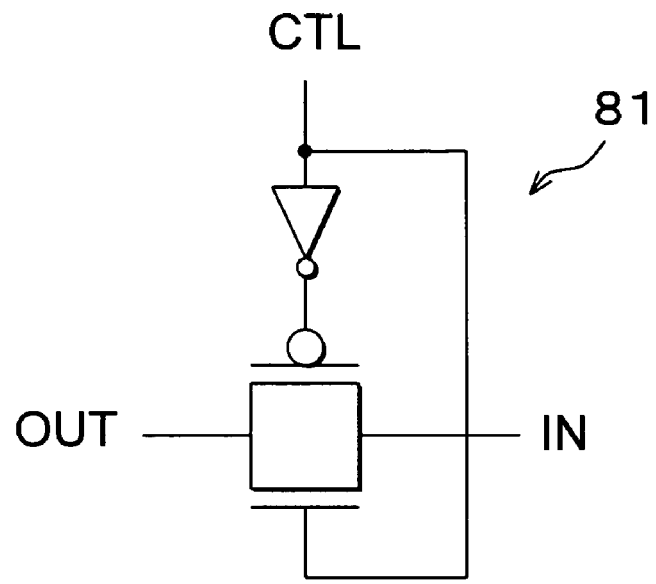
FIG. 18 is a circuit diagram showing an arrangement of an analog switch in the shift register section.
Figure 19:
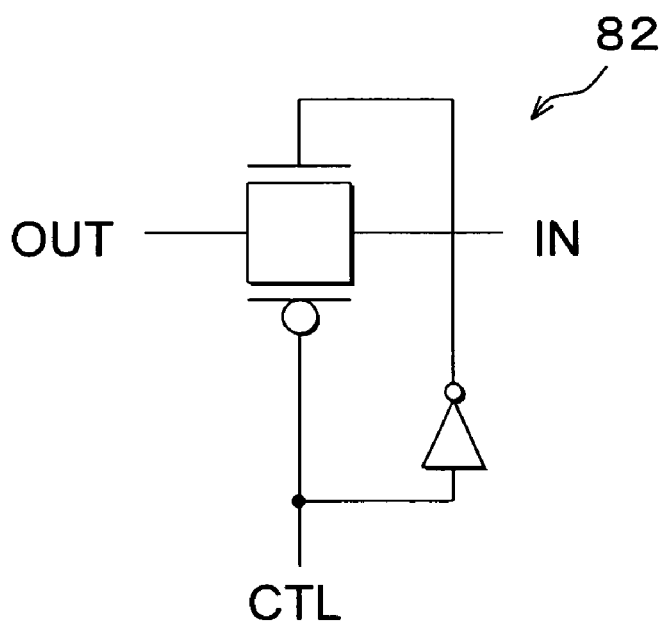
FIG. 19 is a circuit diagram showing an arrangement of another analog switch in the shift register section.
Figure 20:
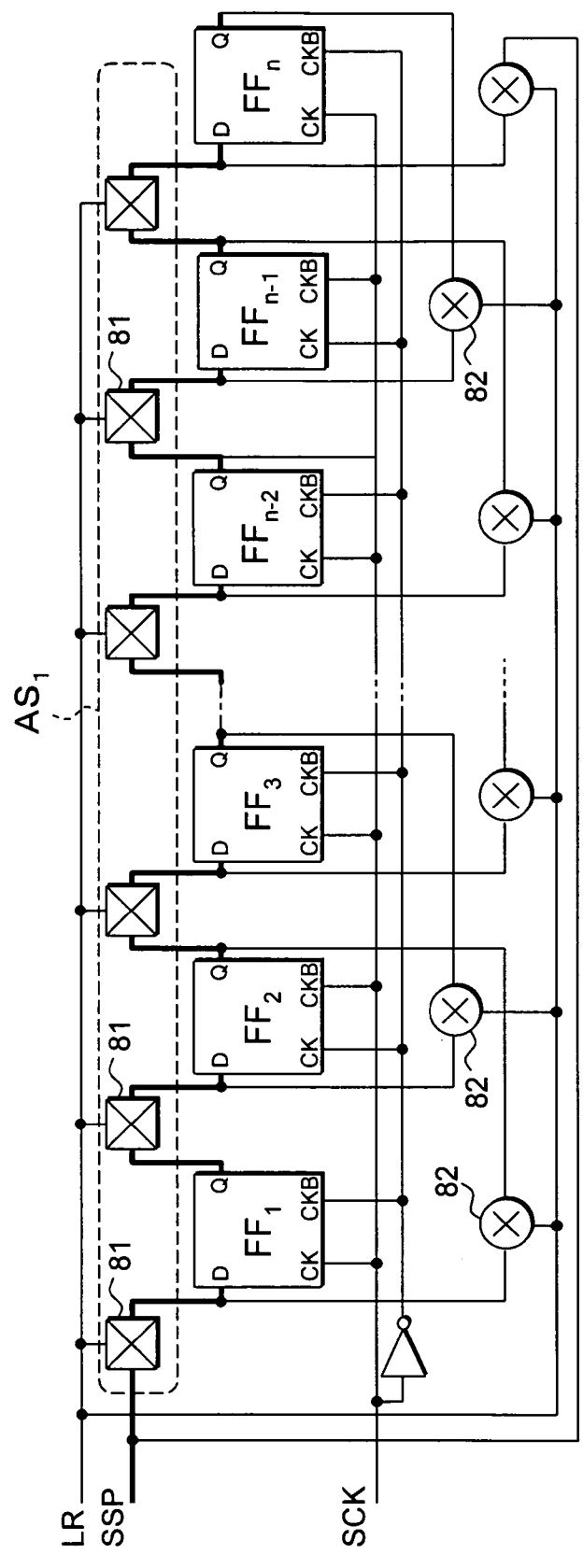
FIG. 20 is a diagram showing signal flows in the shift register section when the horizontal instruction signal LR is HIGH.
Figure 21:
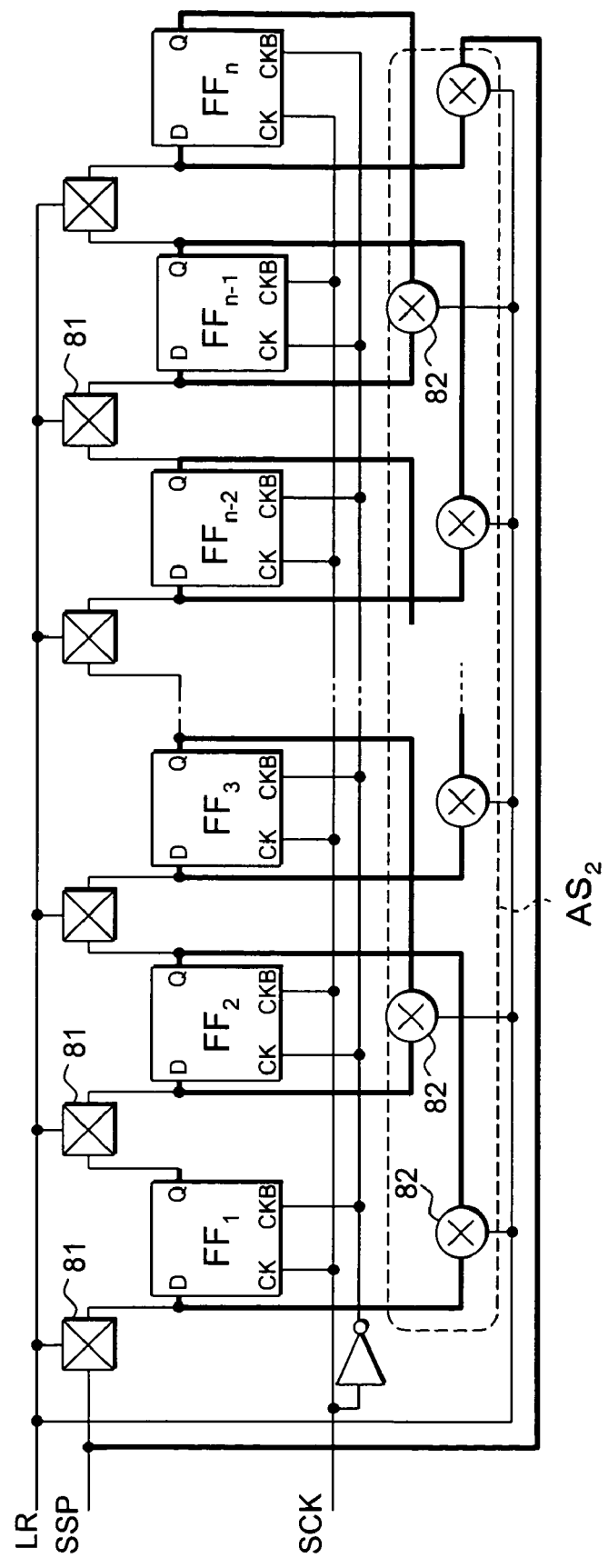
FIG. 21 is a diagram showing signal flows in the shift register section when the horizontal instruction signal LR is LOW.
Figure 22:
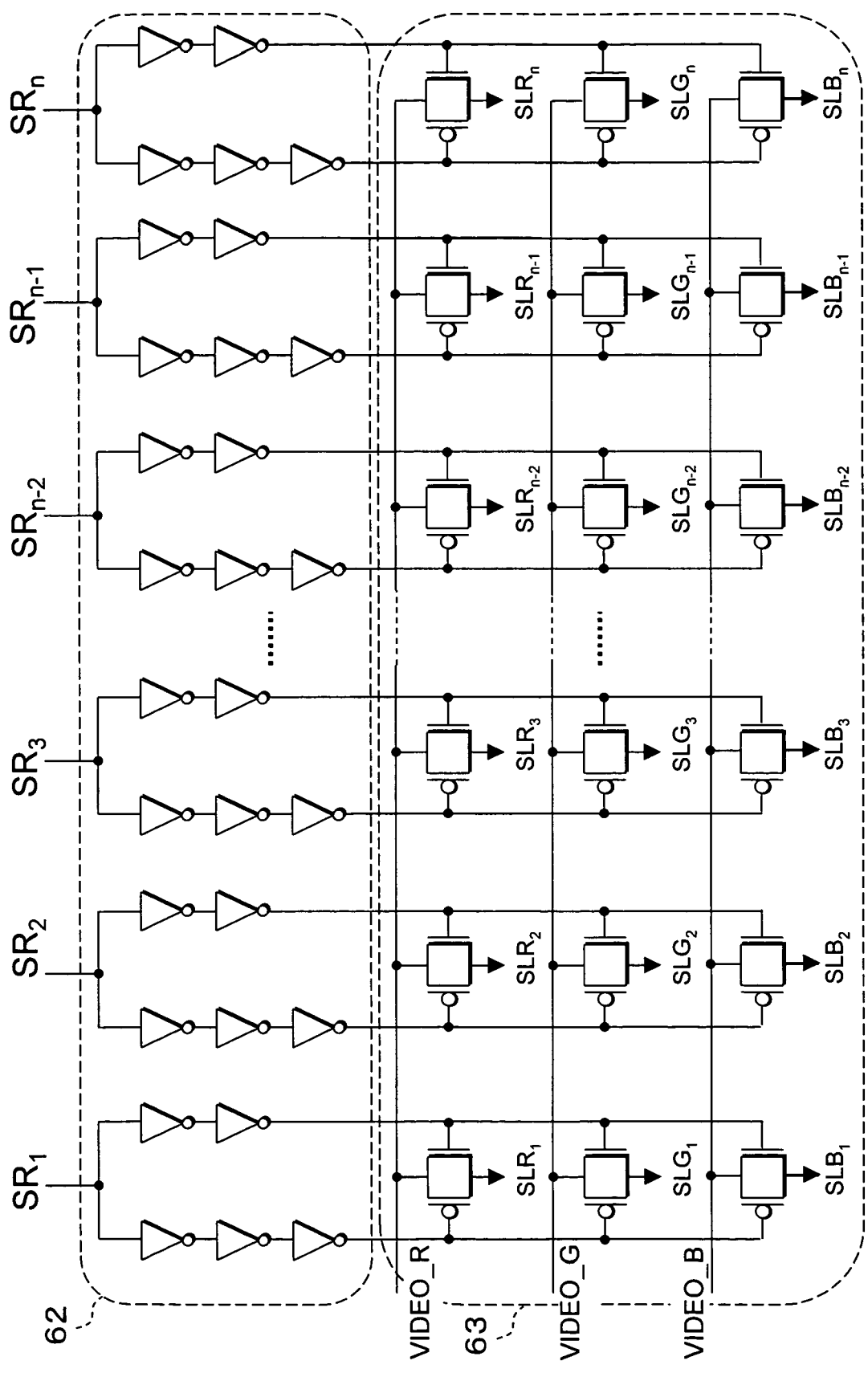
FIG. 22 is a circuit diagram showing an arrangement of a buffer section and a sampling section in a data signal line drive circuit in the display device.

A further alternative is to provide two waveform change sections in the bidirectional shift register 21 as shown in FIG. 15 where the two outputs of the shift register section 24, i.e. the pulse signal $SR_1$ and the pulse signal $SR_n$, are fed to the respective waveform change sections.

However, when this is the case, for example, the output signals of the two waveform change sections need to be distinguishable from each other, by, for example, using the waveform change section 26 and the waveform change section 26' for the two waveform change sections (the first and second waveform change section).

When this is the case, one of the waveform change sections corresponds to the first waveform change means in claims, and the other waveform change section to the second waveform change means in claims. In addition, the inspection signal switching section 25 when there are provided two waveform change means in this manner corresponds to the second switching means in claims.

Figure 29:
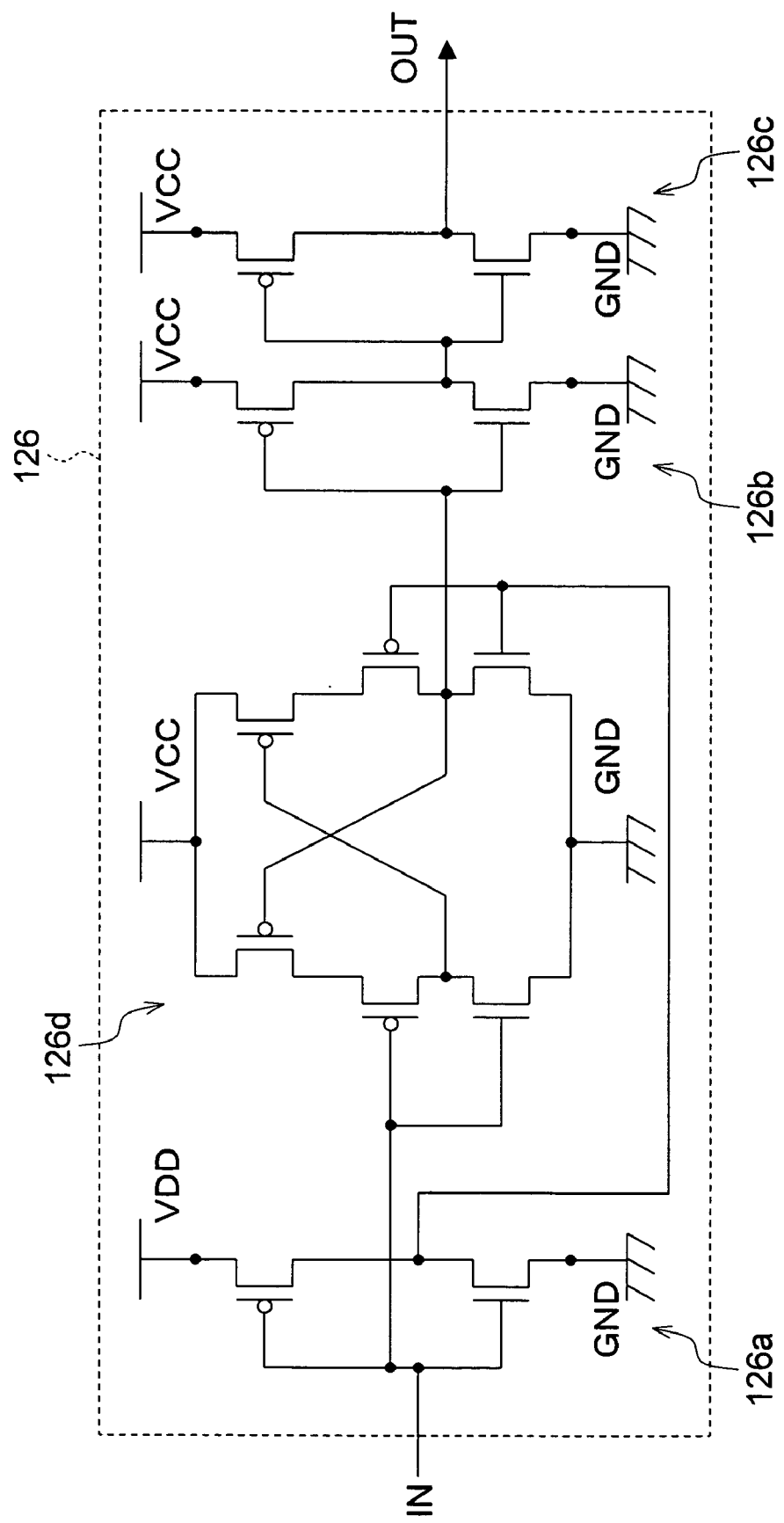
FIG. 29 is a circuit diagram showing another arrangement of the waveform change section.

FIG. 29 is a circuit diagram showing a waveform change section 126 which is a further arrangement example for the waveform change section 26.

The waveform change section 126, as shown in the figure, is composed of three inverters 126a, 126b, 126c and a level shifter 126d. The inverter 126a inverts input signals at the IN. The level shifter 126d shifts the level of the signal inverted by the inverter 126a. Further, a 2-stage inverter containing the inverters 126b, 126c buffers the signal of which the level has been shifted by the level shifter 126d to produce an output at the OUT.

Figure 30:
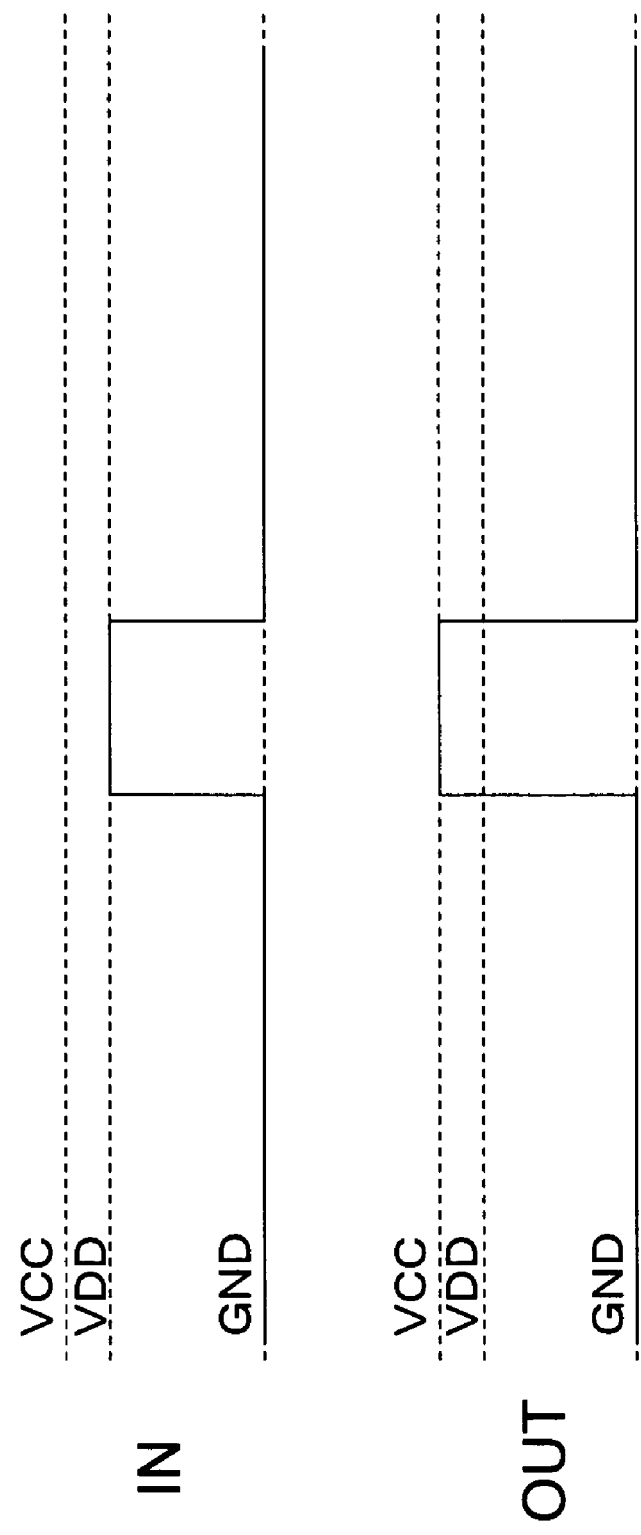
FIG. 30 is a timing chart showing a signal which appears at the OUT when a constant-amplitude pulse signal is applied to the IN of the waveform change section in FIG. 29.

Due to the arrangement, the waveform change section 126 raises the amplitude (VDD, relative to GND) of the input signal at the IN to a predetermined value (VCC, relative to GND) to produce an output at the OUT as shown in FIG. 30. More specifically, the waveform change section 126 raises the level of HIGH signals from VDD to VCC. The section 126 does not change the level (GND) of LOW signals. FIG. 30 is a timing chart showing a signal appearing at the OUT when a pulse signal at an amplitude of VDD is applied to the IN of the waveform change section 126.

For the arrangement shown in FIG. 29, for convenience in description, the pulse signals immediately after the output from the shift register section 24 is assumed to have an amplitude in the GND-VDD range.

Figure 31:
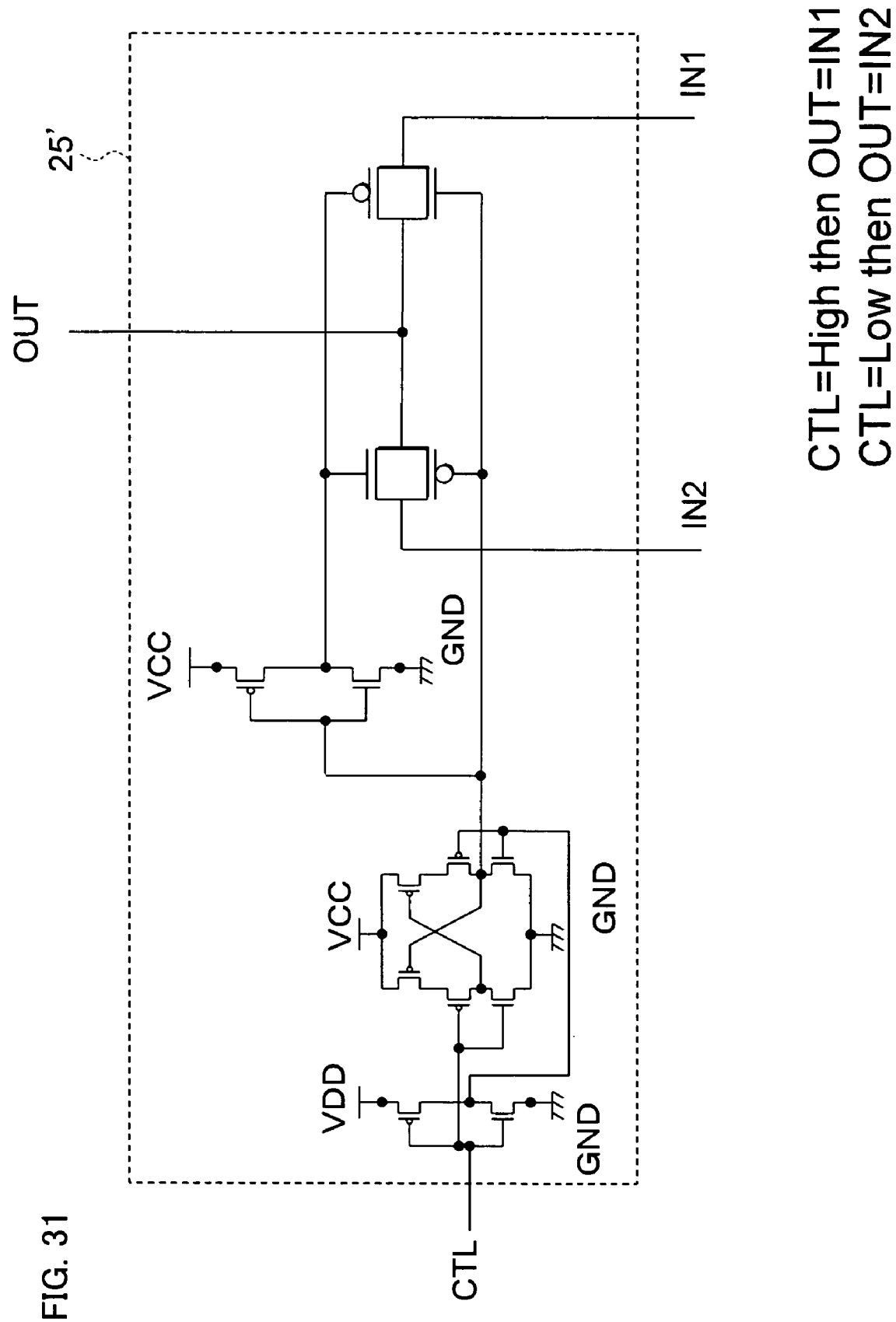
FIG. 31 is a circuit diagram showing an inspection signal switching section used alongside the waveform change section in FIG. 29.

FIG. 31 is a circuit diagram showing an inspection signal switching section (the first switching means) 25' for use with the waveform change section 126. When the waveform change section 126 is used in place of the waveform change section 26, the arrangement of the inspection signal switching section is also changed.

However, similarly to the aforementioned inspection signal switching section 25, in the inspection signal switching section 25', when the horizontal instruction signal LR on the control line CTL is HIGH, the input signal at the $IN_1$ appears unchanged at the OUT. In contrast, when the horizontal instruction signal LR on the control line CTL is LOW, the input signal at the $IN_2$ appears unchanged at the OUT. The output pulse signal $SR_1$ of the shift register section 24 is directly coupled to the $IN_2$ of the inspection signal switching section 25'.

Figure 32:
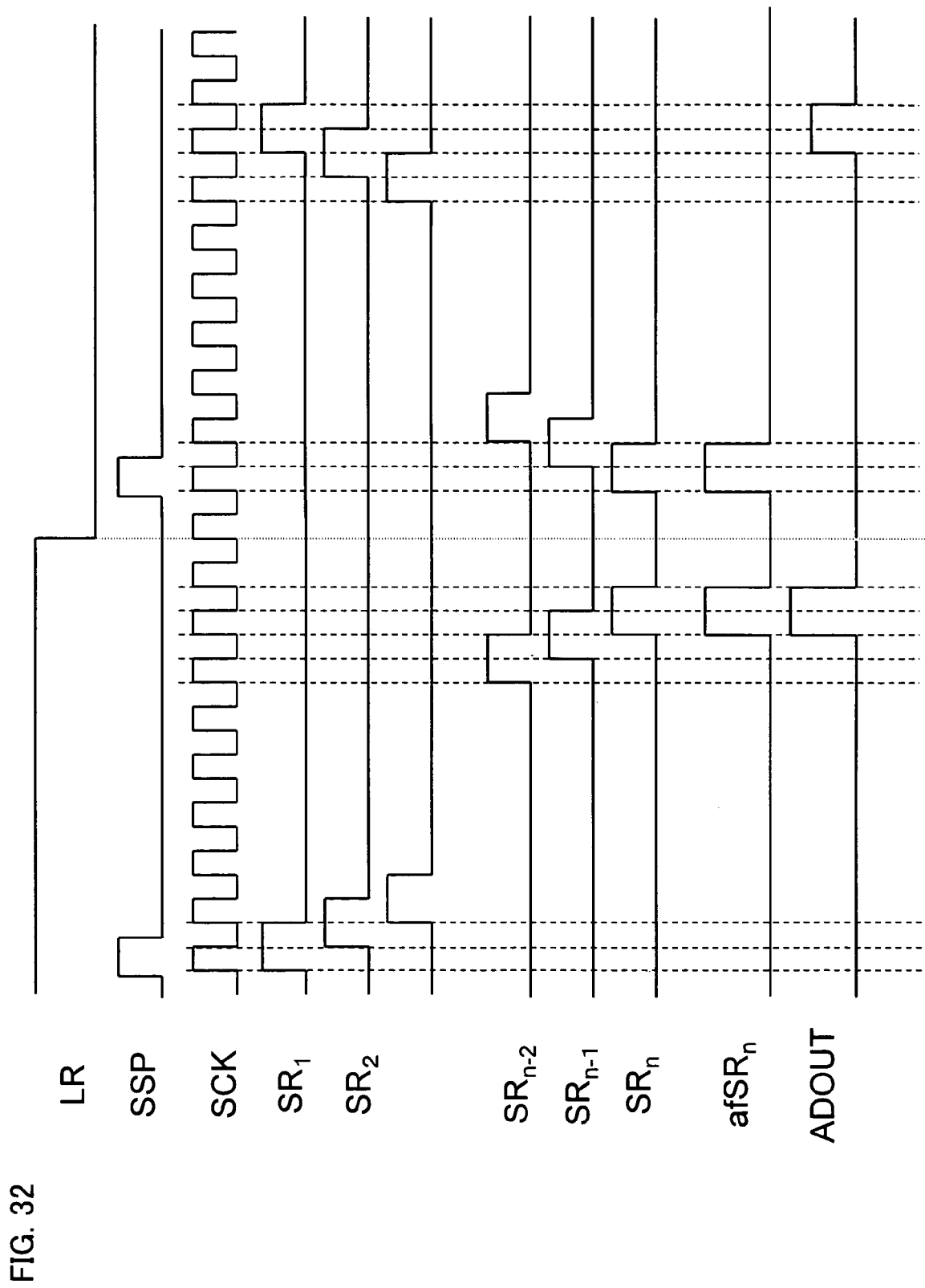
FIG. 32 is a timing chart showing an operation of a bidirectional shift register incorporating the waveform change section in FIG. 29.

FIG. 32 is a timing chart showing an operation of a bidirectional shift register 21 incorporating the waveform change section 126. FIG. 32 is a timing chart when the horizontal instruction signal LR changes from HIGH to LOW during an operation.

Due to the arrangement of the waveform change section 126, as shown in the figure, the output pulse signal af$SR_n$ of the waveform change section 126 has a greater amplitude than the input pulse signal $SR_n$ of the waveform change section 126.

Therefore, when the horizontal instruction signal LR is HIGH, the pulse signal af$SR_n$ having a greater amplitude than the pulse signal $SR_n$ is output as a shift end signal ADOUT. In contrast, when the horizontal instruction signal LR is LOW, the pulse signal $SR_1$ having the same amplitude as the pulse signal $SR_n$ is output.

In this manner, the waveform of the shift end signal ADOUT changes with the state of the horizontal instruction signal LR.

Therefore, the use of the bidirectional shift register 21 incorporating the waveform change section 126 also produces effects which will be detailed later.

Figure 33:
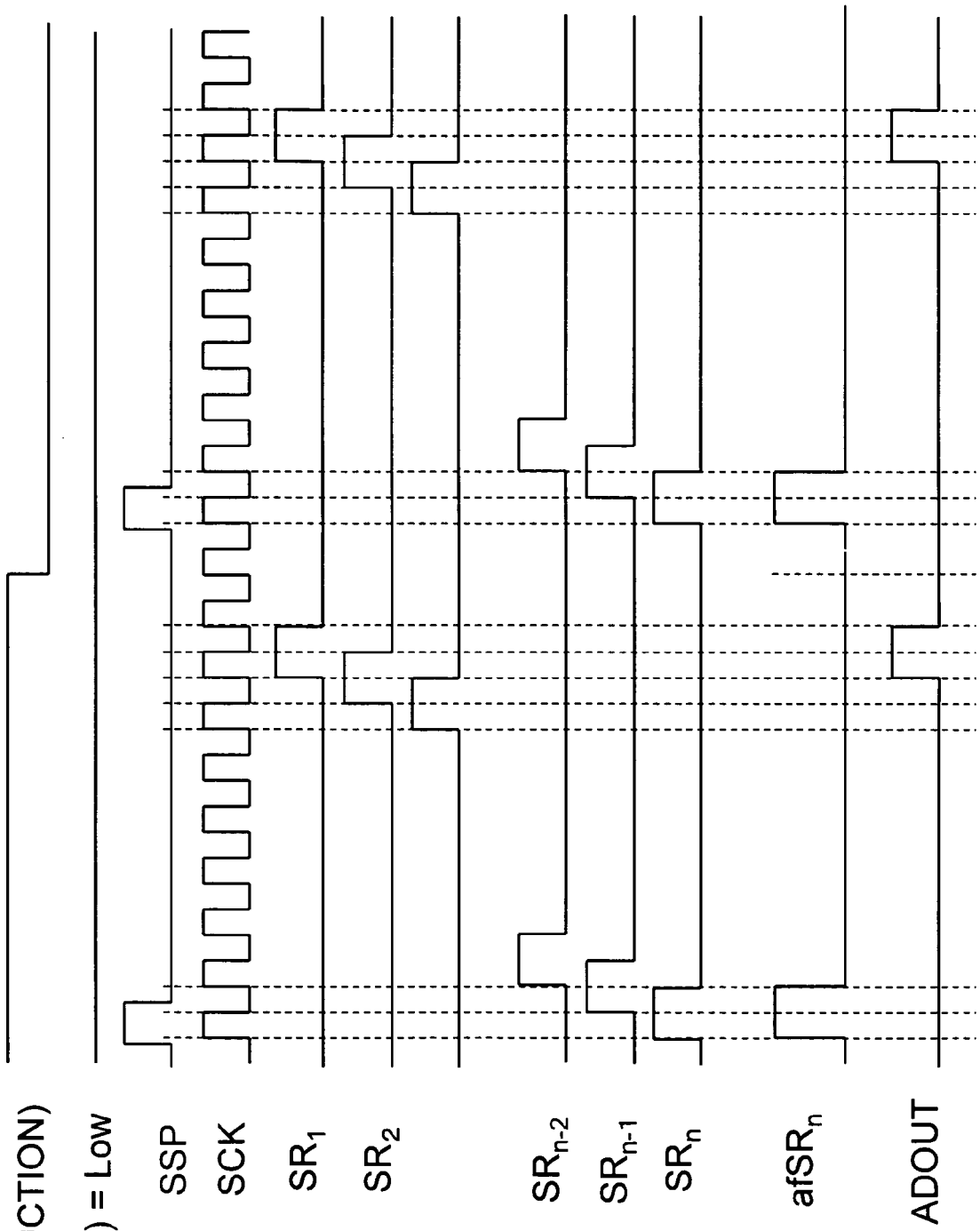
FIG. 33 is a timing chart when the horizontal instruction signal LR is fixed in LOW state due to, for example, a defect of internal circuitry of a bidirectional shift register incorporating the waveform change section in FIG. 29.

FIG. 33 is a timing chart when the horizontal instruction signal LR is fixed in LOW state due to, for example, a defect of internal circuitry of the bidirectional shift register 21 incorporating the waveform change section 126 although the register 21 has received an instruction to change the state of the horizontal instruction signal LR.

When this is the case, as shown in the figure, the resultant shift end signal ADOUT again has a different waveform from when the bidirectional shift register 21 is in normal operation (see FIG. 32).

This is because, as mentioned earlier, (i) the waveform of the shift end signal ADOUT changes with the state of the horizontal instruction signal LR while the bidirectional shift register 21 is in normal operation, and (ii) the waveform of the shift end signal ADOUT is fixed when the horizontal instruction signal LR remains unchanged in LOW state.

Therefore, with the FIG. 32 waveform of the shift end signal ADOUT being recognized as the normal waveform in advance, a FIG. 33 waveform of the shift end signal ADOUT can be safely determined to be an indication of a defect of the bidirectional shift register 21.

Figure 34:
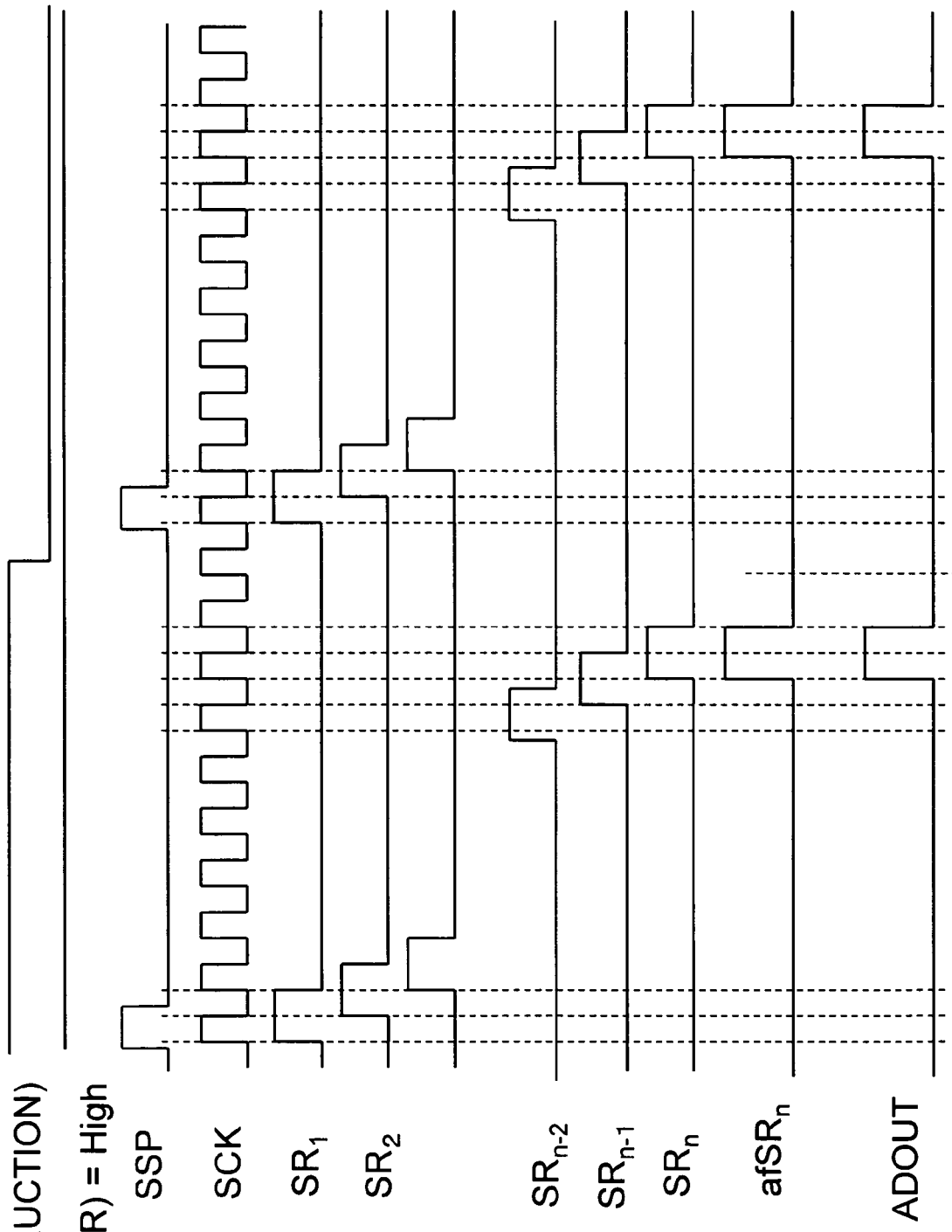
FIG. 34 is a timing chart when the horizontal instruction signal LR is fixed in HIGH state due to, for example, a defect of internal circuitry of a bidirectional shift register incorporating the waveform change section in FIG. 29.

FIG. 34 is a timing chart when the horizontal instruction signal LR is fixed in HIGH state due to, for example, a defect of internal circuitry of the bidirectional shift register 21 incorporating the waveform change section 126 although the register 21 has received an instruction to change the state of the horizontal instruction signal LR.

When this is the case, as shown in the figure, the resultant shift end signal ADOUT again has a different waveform from when the bidirectional shift register 21 is in normal operation (see FIG. 32).

Therefore, with the FIG. 32 waveform of the shift end signal ADOUT being recognized as the normal waveform in advance, a FIG. 34 waveform of the shift end signal ADOUT can be safely determined to be an indication of a defect of the bidirectional shift register 21.

For these reasons, a bidirectional shift register is provided which can be determined to be operating normally or otherwise in both directions without providing additional inspection terminals on the waveform change section 126. In addition, prior to the liquid crystal step described in the BACKGROUND OF THE INVENTION section, the bidirectional shift register 21 can be determined to be operating normally or otherwise in both directions. Thus, the manufacturing cost of a display device 1 incorporating the bidirectional shift register 21 is reducible.

Figure 35:
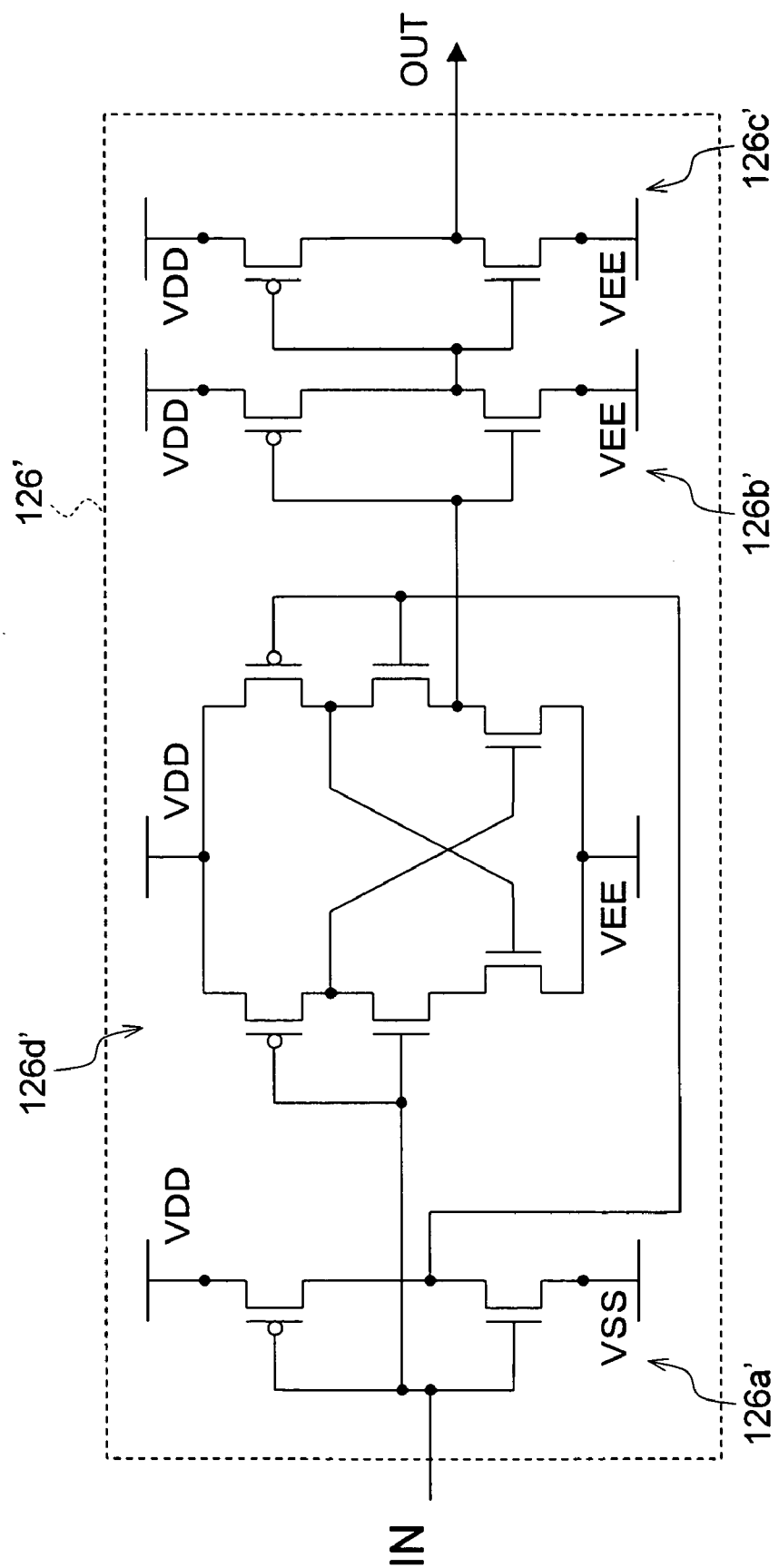
FIG. 35 is a circuit diagram showing another arrangement of the waveform change section.

The waveform change section 126 may be replaced with a waveform change section having another arrangement. FIG. 35 is a circuit diagram showing a waveform change section 126' which is another arrangement example for the waveform change section 126.

The waveform change section 126', as shown in the figure, is composed of three inverters 126a', 126b', 126c' and a level shifter 126d'. The inverter 126a' inverts input signals at the IN. The level shifter 126d' shifts the level of the signal inverted by the inverter 126a'. Further, a 2-stage inverter containing the inverters 126b', 126c' buffers the signal of which the level has been shifted by the level shifter 126d' to produce an output at the OUT.

Figure 36:
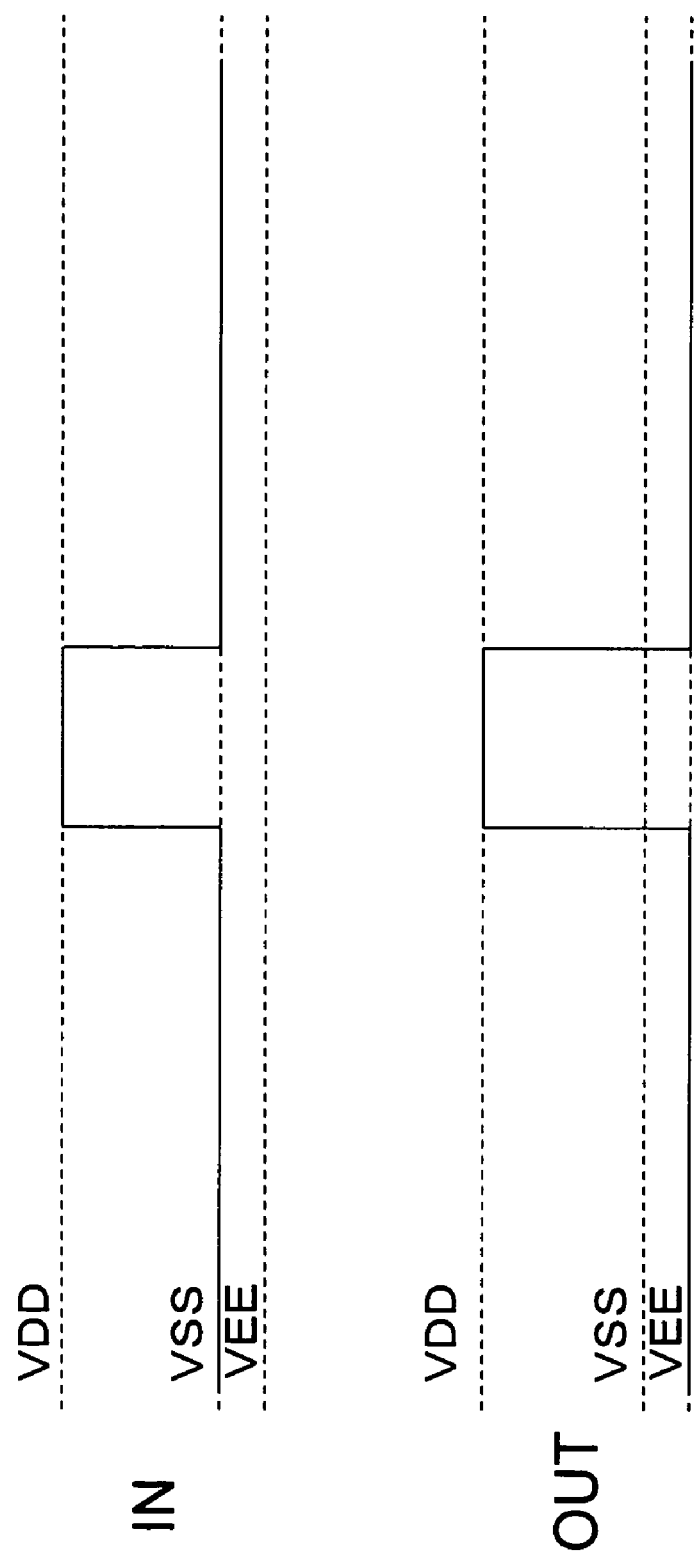
FIG. 36 is a timing chart showing a signal which appears at the OUT when a constant-amplitude pulse signal is applied to the IN of the waveform change section in FIG. 35.

Due to the arrangement, the waveform change section 126' lowers the voltage level of a LOW signal from VSS to VEE as shown in FIG. 36. The section 126' does not change the voltage level of a HIGH signal at VDD. FIG. 36 is timing chart showing a signal appearing at the OUT when a pulse signal at an amplitude equal to the VDD-VSS difference is applied to the IN of the waveform change section 126'.

For the arrangement shown in FIG. 35, for convenience in description, the pulse signals immediately after the output from the shift register section 24 is assumed to have an amplitude equal to VSS-VDD.

Figure 37:
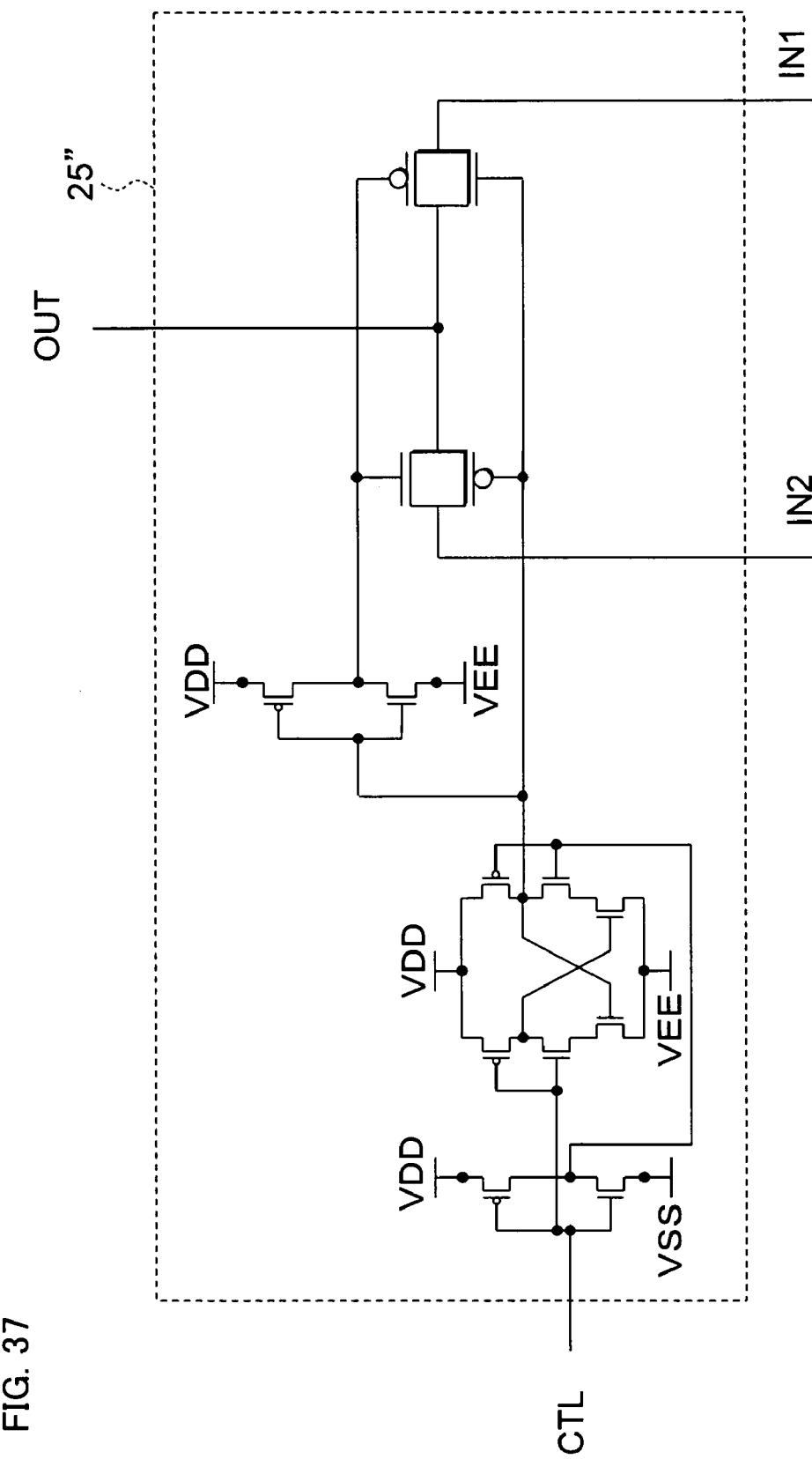
FIG. 37 is a circuit diagram showing an inspection signal switching section used alongside the waveform change section in FIG. 35.

FIG. 37 is a circuit diagram showing an inspection signal switching section (the first switching means) 25" for use with the waveform change section 126'. When the waveform change section 126' is used in place of the waveform change section 126, the arrangement of the inspection signal switching section is also changed.

However, again similarly to the aforementioned inspection signal switching section 25', in the inspection signal switching section 25", when the horizontal instruction signal LR on the control line CTL is HIGH, the input signal at the $IN_1$ appears unchanged at the OUT. In contrast, when the horizontal instruction signal LR on the control line CTL is LOW, the input signal at the $IN_2$ appears unchanged at the OUT. The output pulse signal $SR_1$ of the shift register section 24 is directly coupled to the $IN_2$ of the inspection signal switching section 25'.

Figure 38:
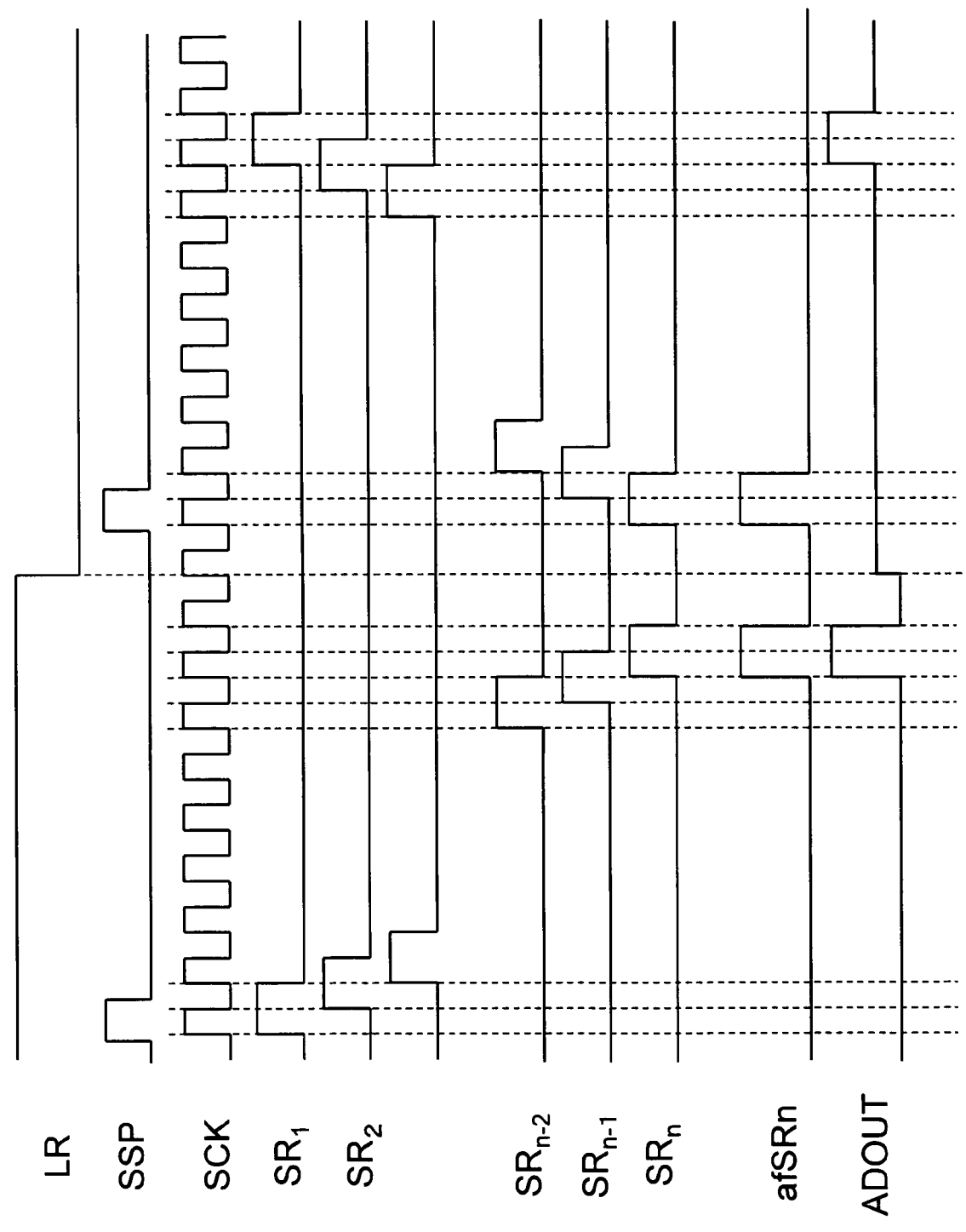
FIG. 38 is a timing chart showing an operation of a bidirectional shift register incorporating the waveform change section in FIG. 35.

FIG. 38 is a timing chart showing an operation of a bidirectional shift register 21 incorporating the waveform change section 126'. FIG. 38 is a timing chart when the horizontal instruction signal LR changes from HIGH to LOW during an operation.

Due to the arrangement of the waveform change section 126', as shown in the figure, the output pulse signal $afSR_n$ of the waveform change section 126' has a greater amplitude than the input pulse signal $SR_n$ of the waveform change section 126'.

Therefore, when the horizontal instruction signal LR is HIGH, the pulse signal $afSR_n$ having a greater amplitude than the pulse signal $SR_n$ is output as a shift end signal ADOUT. In contrast, when the horizontal instruction signal LR is LOW, the pulse signal $SR_1$ having the same amplitude as the pulse signal $SR_n$ is output.

In this manner, the waveform of the shift end signal ADOUT changes with the state of the horizontal instruction signal LR.

Therefore, the use of the bidirectional shift register 21 incorporating the waveform change section 126' also produces effects which will be detailed later.

Figure 39:
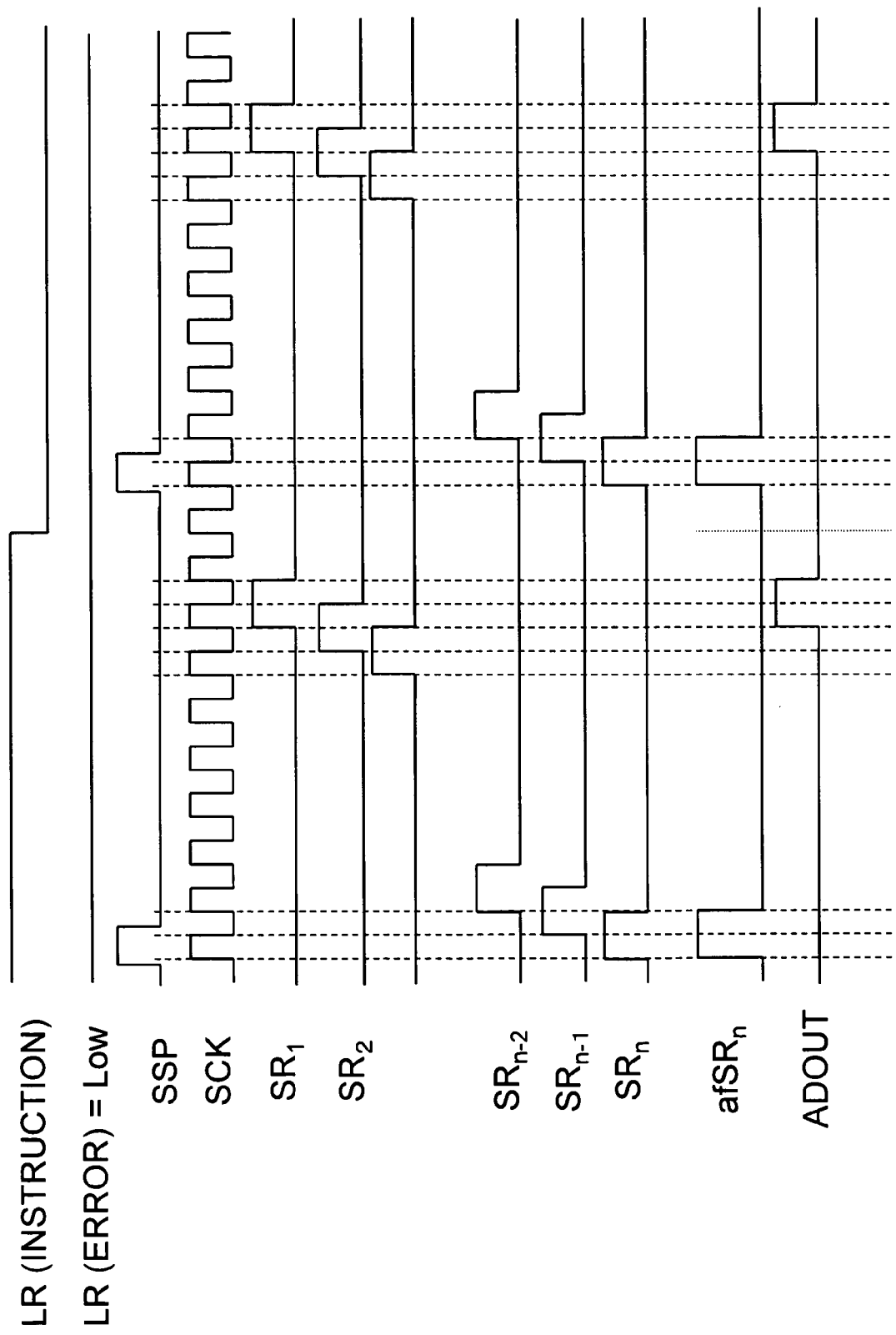
FIG. 39 is a timing chart when the horizontal instruction signal LR is fixed in LOW state due to, for example, a defect of internal circuitry of a bidirectional shift register incorporating the waveform change section in FIG. 35.

FIG. 39 is a timing chart when the horizontal instruction signal LR is fixed in LOW state due to, for example, a defect of internal circuitry of the bidirectional shift register 21 incorporating the waveform change section 126' although the register 21 has received an instruction to change the state of the horizontal instruction signal LR.

When this is the case, as shown in the figure, the resultant shift end signal ADOUT again has a different waveform from when the bidirectional shift register 21 is in normal operation (see FIG. 38).

This is because, as mentioned earlier, (i) the waveform of the shift end signal ADOUT changes with the state of the horizontal instruction signal LR while the bidirectional shift register 21 is in normal operation, and (ii) the waveform of the shift end signal ADOUT is fixed when the horizontal instruction signal LR remains unchanged in LOW state.

Therefore, with the FIG. 38 waveform of the shift end signal ADOUT being recognized as the normal waveform in advance, a FIG. 39 waveform of the shift end signal ADOUT can be safely determined to be an indication of a defect of the bidirectional shift register 21.

Figure 40:
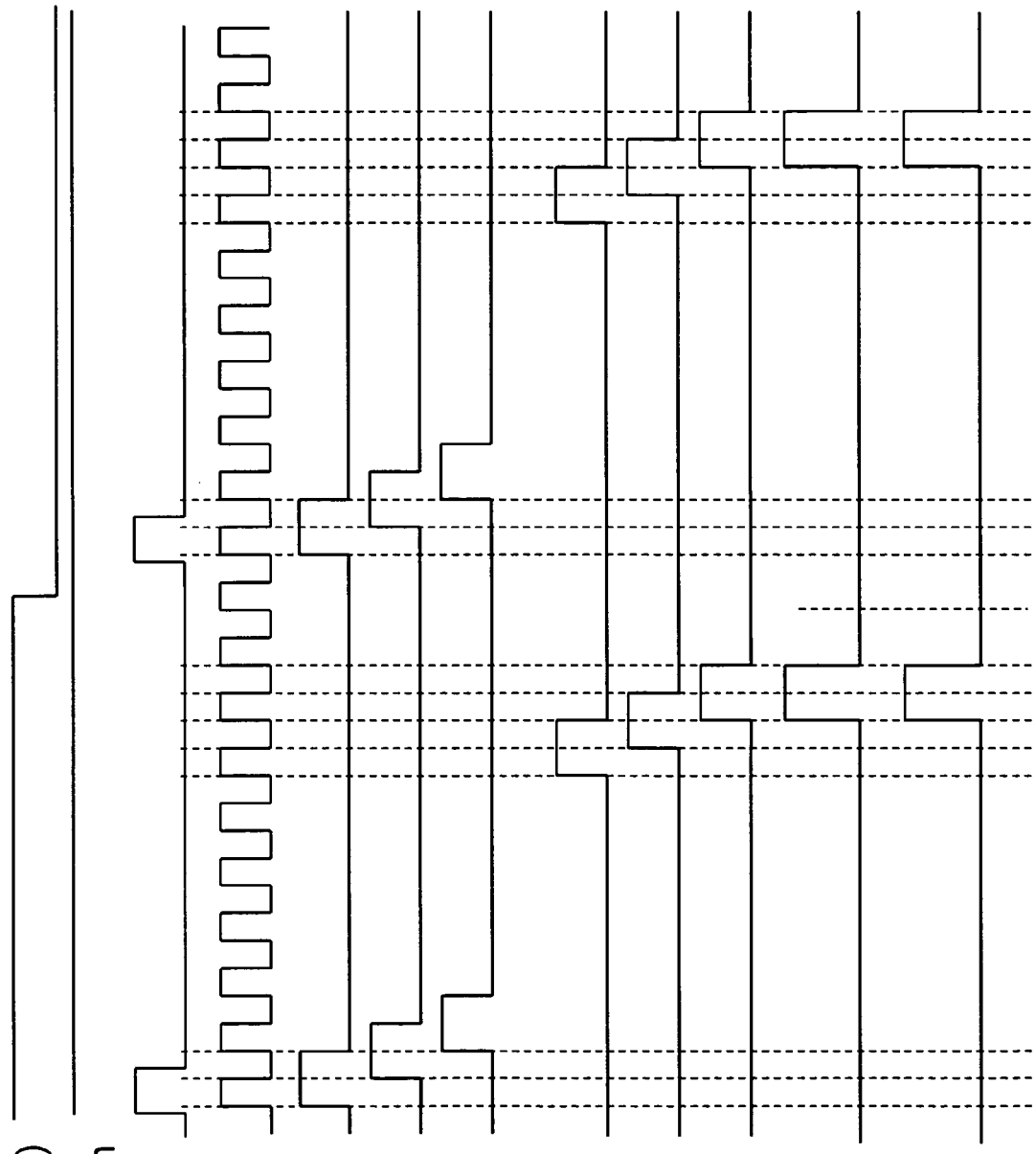
FIG. 40 is a timing chart when the horizontal instruction signal LR is fixed in HIGH state due to, for example, a defect of internal circuitry of a bidirectional shift register incorporating the waveform change section in FIG. 35.

FIG. 40 is a timing chart when the horizontal instruction signal LR is fixed in HIGH state due to, for example, a defect of internal circuitry of the bidirectional shift register 21 incorporating the waveform change section 126' although the register 21 has received an instruction to change the state of the horizontal instruction signal LR.

When this is the case, as shown in the figure, the resultant shift end signal ADOUT again has a different waveform from when the bidirectional shift register 21 is in normal operation (see FIG. 38).

Therefore, with the FIG. 38 waveform of the shift end signal ADOUT being recognized as the normal waveform in advance, a FIG. 40 waveform of the shift end signal ADOUT can be safely determined to be an indication of a defect of the bidirectional shift register 21.

For these reasons, a bidirectional shift register is provided which can be determined to be operating normally or otherwise in both directions without providing additional inspection terminals to the waveform change section 126'. In addition, prior to the liquid crystal step described in the BACKGROUND OF THE INVENTION section, the bidirectional shift register 21 can be determined to be operating normally or otherwise in both directions. Thus, the manufacturing cost of a display device 1 incorporating the bidirectional shift register 21 is reducible.

The waveform change section 126, 126' only needs to be capable of altering the amplitude of the input signal at the IN as in the foregoing, and is not limited to the arrangement.

The foregoing description assumed that the output pulse signal $SR_n$ of the shift register section 24 was fed to the waveform change section (126, 126'). This is not the only possibility. For example, the waveform change section (126, 126') may be connected differently to the shift register section 24 as shown in FIG. 14 where the output pulse signal $SR_1$ of the shift register section 24 is fed to the waveform change section (126, 126').

The embodiment assumed that the pulse signal $SR_n$ and/or the pulse signal $SR_1$ was (were) fed to the waveform change section. This is the only possibility. For example, the pulse signal $SR_i$ (1<i<n) may be fed to the waveform change section. When this is the case, the flip-flop $FF_i$ outputting the pulse signal $SR_i$ corresponds to the flip-flop in the first predetermined stage in claims.

Preferably, i has a value close to n or 1, because such a value setting enables checking of operation of the flip-flops in the bidirectional shift register 21 down to those near the last output stage.

However, an arrangement where the pulse signal $SR_n$ and/or the pulse signal $SR_1$ is (are) fed to the waveform change section is preferred, because the operation of the flip-flops in the bidirectional shift register 21 can be checked down to the last output stage in both directions.

In the embodiment, the pulse signal $SR_1$ was directly fed to the $IN_2$ of the inspection signal switching section 25. This is however not the only possibility. For example, a pulse signal $SR_j$ (1<j<n) may be directly fed to the inspection signal switching section 25. When this is the case, the flip-flop $FF_j$ outputting the pulse signal $SR_j$ corresponds to the flip-flop in the second predetermined stage in claims.

Preferably, j has a value close to n or 1, because such a value setting enables checking of operation of the flip-flops in the bidirectional shift register 21 down to those near the last output stage.

However, an arrangement where the pulse signal $SR_n$ and/or the pulse signal $SR_1$ is (are) fed to the inspection signal switching section 25 is preferred, because the operation of the flip-flops in the bidirectional shift register 21 can be checked down to the last output stage in both directions.

The foregoing description took the bidirectional shift register 21 contained in the data signal line drive circuit 2 as an example. Detailed description was omitted regarding the bidirectional shift register 31 contained in the scan signal line drive circuit 3; however, a similar description applies to the register 31.

In the display device 1, for example, there may be provided another data signal line drive circuit opposite to the data signal line drive circuit 2 across the display device section 4 so that the other data signal line drive circuit contains a bidirectional shift register. Also, in the display device 1, for example, there may be provided another scan signal line drive circuit opposite to the scan signal line drive circuit 3 across the display device section 4 so that the other scan signal line drive circuit contains a bidirectional shift register. Also, in the display device 1, there may be provided these additional data signal line drive circuit and scan signal line drive circuit so that their drive circuits each contain a bidirectional shift register.

The bidirectional shift registers 21, 31 in accordance with the present embodiment are also applicable in various drivers and drive circuits. The bidirectional shift register in accordance with the present invention is applicable in various display devices including liquid crystal display devices, organic light-emitting display devices, and plasma display devices.

As in the foregoing, a bidirectional shift register in accordance with the present invention is arranged to include:

shift register means, including multiple-stage flip-flops operating in synchronism with a clock signal, for switching a shift direction in accordance with an externally supplied direction instruct signal;

first waveform change means for changing in waveform a signal output of one of the flip-flops which is in a first predetermined stage; and first switching means for switching, in accordance with the direction instruct signal, an output thereof between the signal output which has been changed in waveform in the first waveform change means and a signal output of one of the flip-flops which is in a second predetermined stage.

It is preferred if the bidirectional shift register in accordance with the present invention is such that in the foregoing bidirectional shift register:

the flip-flops are numbered sequentially from a first to an n-th with one of the flip-flops in proximity to the first flip-flop being a p-th flip-flop and one of the flip-flops in proximity to the n-th flip-flop being a q-th flip-flop;

the flip-flop in the first predetermined stage is either the p-th flip-flop or the q-th flip-flop; and the flip-flop in the second predetermined stage is the q-th flip-flop when the flip-flop in the first predetermined stage is the p-th flip-flop and the p-th flip-flop when the flip-flop in the first predetermined stage is the q-th flip-flop.

According to the arrangement, the signal input to the first waveform change means is the signal output of a flip-flop provided in proximity to one of the multiple-stage flip-flops which is in either the first or last stage. The first switching means thus receives the signal output of a flip-flop near either the first or last stage.

The signal input of the first switching means which does not come via the first waveform change means is the signal output of a flip-flop provided in proximity to one of the multiple-stage flip-flops which is in either the first or last stage.

Therefore, it can be checked whether the flip-flop in the first output stage (the first or n-th flip-flop) through either the flip-flop in the last output stage or one near that flip-flop are all operating normally in both directions when the bidirectional shift direction is switched, which is an effect of the invention.

It is preferred if the bidirectional shift register in accordance with the present invention is such that in the foregoing bidirectional shift register:

the flip-flops are numbered sequentially from a first to an n-th;

the flip-flop in the first predetermined stage is either the first flip-flop or the n-th flip-flop; and the flip-flop in the second predetermined stage is the n-th flip-flop when the flip-flop in the first predetermined stage is the first flip-flop and the first flip-flop when the flip-flop in the first predetermined stage is the n-th flip-flop.

According to the arrangement, the signal input of the first waveform change means is the signal output of one of the multiple-stage flip-flops which is in either the first or last stage. The first switching means thus receives the signal output of the flip-flop in either the first or last stage.

The signal input of the first switching means which does not come via the first waveform change means is the signal output of a flip-flop provided in proximity to one of the multiple-stage flip-flops which is in either the first or last stage.

Therefore, it can be checked whether the flip-flop in the first output stage (the first or n-th flip-flop) through either the flip-flop in the last output stage (the n-th or first flip-flop) are all operating normally in both directions when the bidirectional shift direction is switched, which is an effect of the invention.

It is also preferred if the bidirectional shift register in accordance with the present invention is such that in the foregoing bidirectional shift register, the first waveform change means inverts a signal level of the signal output of the flip-flop in the first predetermined stage.

According to the arrangement, the first waveform change means inverts the signal level of the signal output of the flip-flop in the first predetermined stage.

Therefore, by inverting the signal level of the signal output of the flip-flop in the first predetermined stage, the first switching means receives signals of differing waveforms, which is an effect of the invention. Therefore, the first switching means outputs different signals in accordance with the direction instruct signal.

It is also preferred if the bidirectional shift register in accordance with the present invention is such that in the foregoing bidirectional shift register, the first waveform change means distorts the waveform of the signal output of the flip-flop in the first predetermined stage.

According to the arrangement, the first waveform change means distorts the waveform of the incoming signal.

Therefore, by distorting the waveform of the signal output of the flip-flop in the first predetermined stage, the first switching means receives signals of differing waveforms, which is an effect of the invention. Therefore, the first switching means outputs different signals in accordance with the direction instruct signal.

It is also preferred if the bidirectional shift register in accordance with the present invention is such that in the foregoing bidirectional shift register, the first waveform change means changes in amplitude the signal output of the flip-flop in the first predetermined stage.

According to the arrangement, the first waveform change means changes the incoming signal in amplitude.

Therefore, by changing in amplitude the signal output of the flip-flop in the first predetermined stage, the first switching means receives signals of differing waveforms, which is an effect of the invention. Therefore, the first switching means outputs different signals in accordance with the direction instruct signal.

It is also preferred if the bidirectional shift register in accordance with the present invention is such that in the foregoing bidirectional shift register:

the signal output of the flip-flop in the first predetermined stage is a pulse signal; and the first waveform change means changes in pulse width the signal output of the flip-flop in the first predetermined stage.

According to the arrangement, the first waveform change means changes the incoming signal in pulse width.

Therefore, by changing in pulse width the signal output of the flip-flop in the first predetermined stage, the first switching means receives signals of differing waveforms, which is an effect of the invention. Therefore, the first switching means outputs different signals in accordance with the direction instruct signal.

As in the foregoing, a bidirectional shift register in accordance with the present invention is arranged to include:

shift register means, including multiple-stage flip-flops operating in synchronism with a clock signal, for switching a shift direction in accordance with an externally supplied direction instruct signal;

first waveform change means for changing in waveform a signal output of one of the flip-flops which is in a first predetermined stage;

second waveform change means for changing in waveform a signal output of one of the flip-flops which is in a second predetermined stage so that the signal output which has been changed in waveform in the second waveform change means has a different waveform from the signal output which has been changed in waveform in the first waveform change means; and second switching means for switching, in accordance with the direction instruct signal, an output thereof between the signal output which has been changed in waveform in the first waveform change means and the signal output which has been changed in waveform in the second waveform change means.

As in the foregoing, a display device in accordance with the present invention is arranged to include:

pixels arranged in matrix;

data signal lines, each for a different row of the pixels;

scan signal lines, each for a different column of the pixels;

a scan signal line drive circuit for sequentially supplying a scan signal to the scan signal lines at different timings; and a data signal line drive circuit for supplying to the data signal lines a data signal derived for each of the pixels on the scan signal lines to which the scan signal is supplied from a video signal representing display states of the pixels, wherein at least either the scan signal line drive circuit or the data signal line drive circuit includes the aforementioned bidirectional shift register.

The invention being thus described, it will be obvious that the same way may be varied in many ways. Such variations are not to be regarded as a departure from the spirit and scope of the invention, and all such modifications as would be obvious to one skilled in the art are intended to be included within the scope of the following claims.

What is claimed is:

1. A bidirectional shift register, comprising:

shift register means, including multiple-stage flip-flops operating in synchronism with a clock signal, for switching a shift direction in accordance with an externally supplied direction instruct signal;

first waveform change means for changing in waveform a signal output of one of the flip-flops which is in a first predetermined stage; and first switching means for switching, in accordance with the direction instruct signal, an output thereof between the signal output which has been changed in waveform in the first waveform change means and a signal output of one of the flip-flops which is in a second predetermined stage.

2. The bidirectional shift register as set forth in claim 1, wherein:

the flip-flops are numbered sequentially from a first to an n-th with one of the flip-flops in proximity to the first flip-flop being a p-th flip-flop and one of the flip-flops in proximity to the n-th flip-flop being a q-th flip-flop;

the flip-flop in the first predetermined stage is either the p-th flip-flop or the q-th flip-flop; and the flip-flop in the second predetermined stage is the q-th flip-flop when the flip-flop in the first predetermined stage is the p-th flip-flop and the p-th flip-flop when the flip-flop in the first predetermined stage is the q-th flip-flop.

3. The bidirectional shift register as set forth in claim 1, wherein:

the flip-flops are numbered sequentially from a first to an n-th;

the flip-flop in the first predetermined stage is either the first flip-flop or the n-th flip-flop; and the flip-flop in the second predetermined stage is the n-th flip-flop when the flip-flop in the first predetermined stage is the first flip-flop and the first flip-flop when the flip-flop in the first predetermined stage is the n-th flip-flop.

4. The bidirectional shift register as set forth in claim 1, wherein the first waveform change means inverts a signal level of the signal output of the flip-flop in the first predetermined stage.

5. The bidirectional shift register as set forth in claim 2, wherein the first waveform change means inverts a signal level of the signal output of the flip-flop in the first predetermined stage.

6. The bidirectional shift register as set forth in claim 3, wherein the first waveform change means inverts a signal level of the signal output of the flip-flop in the first predetermined stage.

7. The bidirectional shift register as set forth in claim 1, wherein the first waveform change means distorts the waveform of the signal output of the flip-flop in the first predetermined stage.

8. The bidirectional shift register as set forth in claim 2, wherein the first waveform change means distorts the waveform of the signal output of the flip-flop in the first predetermined stage.

9. The bidirectional shift register as set forth in claim 3, wherein the first waveform change means distorts the waveform of the signal output of the flip-flop in the first predetermined stage.

10. The bidirectional shift register as set forth in claim 1, wherein the first waveform change means changes in amplitude the signal output of the flip-flop in the first predetermined stage.

11. The bidirectional shift register as set forth in claim 2, wherein the first waveform change means changes in amplitude the signal output of the flip-flop in the first predetermined stage.

12. The bidirectional shift register as set forth in claim 3, wherein the first waveform change means changes in amplitude the signal output of the flip-flop in the first predetermined stage.

13. The bidirectional shift register as set forth in claim 1, wherein:

the signal output of the flip-flop in the first predetermined stage is a pulse signal; and the first waveform change means changes in pulse width the signal output of the flip-flop in the first predetermined stage.

14. The bidirectional shift register as set forth in claim 2, wherein:

the signal output of the flip-flop in the first predetermined stage is a pulse signal; and the first waveform change means changes in pulse width the signal output of the flip-flop in the first predetermined stage.

15. The bidirectional shift register as set forth in claim 3, wherein:

the signal output of the flip-flop in the first predetermined stage is a pulse signal; and the first waveform change means changes in pulse width the signal output of the flip-flop in the first predetermined stage.

16. A bidirectional shift register, comprising:

shift register means, including multiple-stage flip-flops operating in synchronism with a clock signal, for switching a shift direction in accordance with an externally supplied direction instruct signal;

first waveform change means for changing in waveform a signal output of one of the flip-flops which is in a first predetermined stage;

second waveform change means for changing in waveform a signal output of one of the flip-flops which is in a second predetermined stage so that the signal output which has been changed in waveform in the second waveform change means has a different waveform from the signal output which has been changed in waveform in the first waveform change means; and second switching means for switching, in accordance with the direction instruct signal, an output thereof between the signal output which has been changed in waveform in the first waveform change means and the signal output which has been changed in waveform in the second waveform change means.

17. A display device, comprising:

pixels arranged in matrix;

data signal lines, each for a different row of the pixels;

scan signal lines, each for a different column of the pixels;

a scan signal line drive circuit for sequentially supplying a scan signal to the scan signal lines at different timings; and a data signal line drive circuit for supplying to the data signal lines a data signal derived for each of the pixels on the scan signal lines to which the scan signal is supplied from a video signal representing display states of the pixels, wherein at least either the scan signal line drive circuit or the data signal line drive circuit includes a bidirectional shift register including:

shift register means, including multiple-stage flip-flops operating in synchronism with a clock signal, for switching a shift direction in accordance with an externally supplied direction instruct signal;

first waveform change means for changing in waveform a signal output of one of the flip-flops which is in a first predetermined stage; and first switching means for switching, in accordance with the direction instruct signal, an output thereof between the signal output which has been changed in waveform in the first waveform change means and a signal output of one of the flip-flops which is in a second predetermined stage.

18. The bidirectional shift register as set forth in claim 17, wherein:

the flip-flops are numbered sequentially from a first to an n-th with one of the flip-flops in proximity to the first flip-flop being a p-th flip-flop and one of the flip-flops in proximity to the n-th flip-flop being a q-th flip-flop;

the flip-flop in the first predetermined stage is either the p-th flip-flop or the q-th flip-flop; and the flip-flop in the second predetermined stage is the q-th flip-flop when the flip-flop in the first predetermined stage is the p-th flip-flop and the p-th flip-flop when the flip-flop in the first predetermined stage is the q-th flip-flop.

19. The bidirectional shift register as set forth in claim 17, wherein:

the flip-flops are numbered sequentially from a first to an n-th;

the flip-flop in the first predetermined stage is either the first flip-flop or the n-th flip-flop; and the flip-flop in the second predetermined stage is the n-th flip-flop when the flip-flop in the first predetermined stage is the first flip-flop and the first flip-flop when the flip-flop in the first predetermined stage is the n-th flip-flop.

\* \* \* \* \*